United States Patent
Lee et al.

(10) Patent No.: US 7,118,362 B2
(45) Date of Patent: Oct. 10, 2006

(54) PELLET-TYPE FOAMS OF NON-CROSSLINKED POLYPROPYLENE RESIN HAVING LOWER MELTING POINT AND PROCESS AND DEVICE FOR PRODUCING THE SAME AND MOLDED FOAMS THEREFROM

(75) Inventors: Hee-Sung Lee, Hwasung-si (KR); Chul Lee, Hwasung-si (KR); Ryeong Lee, Hwasung-si (KR); Jea-Myung Kim, Suwon-si (KR)

(73) Assignee: A San Chemicals, Co., Ltd., Kyunggi-do (KR)

( * ) Notice: Subject to any disclaimer, the term of this patent is extended or adjusted under 35 U.S.C. 154(b) by 146 days.

(21) Appl. No.: 10/478,337

(22) PCT Filed: May 15, 2002

(86) PCT No.: PCT/KR02/00915

§ 371 (c)(1),
(2), (4) Date: Nov. 18, 2003

(87) PCT Pub. No.: WO02/094916

PCT Pub. Date: Nov. 28, 2002

(65) Prior Publication Data

US 2004/0249008 A1 Dec. 9, 2004

(30) Foreign Application Priority Data

| May 23, 2001 | (KR) | 2001/28241 |
| May 23, 2001 | (KR) | 2001/28242 |
| May 23, 2001 | (KR) | 2001/28243 |
| Apr. 30, 2002 | (KR) | 2002/23836 |
| May 14, 2002 | (KR) | 2002/26539 |

(51) Int. Cl.
*B29C 47/82* (2006.01)
*B29C 44/34* (2006.01)

(52) U.S. Cl. ............ 425/4 R; 425/313; 425/183; 425/205; 425/378.1

(58) Field of Classification Search ........... 425/366, 425/205, 4 R, 183, 378.1, 313; B29C 47/82
See application file for complete search history.

(56) References Cited

U.S. PATENT DOCUMENTS 4,480,981 A * 11/1984 Togawa et al. ............ 425/143
4,596,833 A     6/1986 Endo et al. ................. 521/60

(Continued)

FOREIGN PATENT DOCUMENTS

JP        59-135234 A     8/1984

(Continued)

OTHER PUBLICATIONS

PCt International Search Report for PCT/KR02/00915 filed May 15, 2002, 3 pages, Sep. 9, 2002.

*Primary Examiner*—Robert Davis
*Assistant Examiner*—G. Nagesh Rao
(74) *Attorney, Agent, or Firm*—Baker Botts L.L.P.

(57) ABSTRACT

The present invention relates to a pellet-type non-crosslinked polypropylene foam having a melting point of 125 to 140° C., and a process and device for producing said foam. Since the pellet-type foams of non-crosslinked polypropylene of the present invention has a lower melting point and a closed cell content of 80% or more, it is advantageous to mold such foams. The present invention also relates to an article molded from the above pellet-type non-crosslinked polypropylene foams.

14 Claims, 19 Drawing Sheets

U.S. PATENT DOCUMENTS

| | | | |
|---|---|---|---|
| 5,334,356 A * | 8/1994 | Baldwin et al. | 422/133 |
| 5,422,049 A * | 6/1995 | Kruger et al. | 264/464 |
| 5,527,573 A | 6/1996 | Park et al. | |
| 5,634,963 A * | 6/1997 | Strasser et al. | 95/245 |
| 5,817,705 A | 10/1998 | Wilkes et al. | 521/79 |
| 6,051,617 A | 4/2000 | Sasaki et al. | |
| 6,077,875 A | 6/2000 | Sasaki et al. | |
| 6,309,570 B1 * | 10/2001 | Fellabaum | 264/40.1 |
| 6,391,234 B1 * | 5/2002 | Silvi et al. | 264/101 |
| 6,495,804 B1 * | 12/2002 | Zahradnik | 219/421 |
| 6,852,257 B1 * | 2/2005 | Eiva | 264/40.6 |
| 2003/0185925 A1 * | 10/2003 | Nishimura et al. | 425/224 |

FOREIGN PATENT DOCUMENTS

| | | |
|---|---|---|
| JP | 01-110106 A | 4/1989 |
| KR | 1996-31093 A | 9/1996 |
| KR | 1999-73391 A | 10/1999 |
| WO | WO 2004041495 A1 * | 5/2004 |
| WO | WO 2004091889 A1 * | 10/2004 |

* cited by examiner

PELLET-TYPE FOAMS OF NON-CROSSLINKED POLYPROPYLENE RESIN HAVING LOWER MELTING POINT AND PROCESS AND DEVICE FOR PRODUCING THE SAME AND MOLDED FOAMS THEREFROM

RELATED APPLICATIONS

This application claims priority to Korean Patent Application No. 2001-0028241 filed May 23, 2001, Korean Patent Application No. 2001-0028242 filed May 23, 2001, Korean Patent Application No. 2001-0028243 filed May 23, 2001, Korean Patent Application No. 2002-0023836 filed Apr. 30, 2002, Korean Patent Application No. 2002-0026539 filed May 14, 2002 and PCT Application No. PCT/KR02/00915 filed May 15, 2002 entitled Pellet-Type Foams of Non-Crosslinked Polypropylene Resin Having Lower Melting Point and Process and Device for Producing the Same and Molded Foams Therefrom.

TECHNICAL FIELD

The present invention relates to a pellet-type non-crosslinked polypropylene foam having a melting point of 125° C. to 140° C., a process for producing said foam, a device for realizing said process and an article molded from said foam.

BACKGROUND ART

Due to its excellent mechanical strength and cushioning properties, a polypropylene resin foam is widely used as a packaging material, a building material, a heat shield material and the like. However, since polypropylene has a high crystallinity and a low melt viscosity and is difficult to cross-link, it has hereto been quite difficult to obtain a highly expanded product from the polypropylene.

U.S. Pat. No. 5,527,573 (issued Jun. 18, 1996) discloses extruded closed-cell polypropylene resin foam and several methods for producing said foam. The foam of the US patent is in a plank form and has a minimal cross-sectional area of about 5×2.54 square centimeters, a minimal thickness of 12.7 millimeters and a density of about 5 pounds per a cubic foot. The form and properties make it difficult to mold the foam into desired shaped articles. U.S. Pat. No. 6,051,617 (issued Apr. 19, 2000) discloses a foamed polypropylene resin particle useful for molding a foamed, molded article and a method of preparing the same. However, the foamed polypropylene resin particle is prepared by grafting a vinyl comonomer to polypropylene resin particles to form the modified copolymer resin particles and foaming the modified copolymer resin particles. U.S. Pat. No. 6,077,875 (issued Jun. 20, 2000) discloses foamed and expanded beads of a polypropylene resin for molding prepared from a non-crosslinked propylene-ethylene random copolymer. The foamed beads of the US patent has an open cell content of at most 40%, most preferably 25% and has a melting point of at least 141° C.

DISCLOSURE OF INVENTION

A non-crosslinked polypropylene resin is advantageous as it can be recycled and the pellet-type foam produced from the resin can be easily molded. However, the pellet-type foam obtained through extrusion of the non-crosslinked polypropylene resin contains open cells to no small extent and thus is useless. For its practicability, the pellet-type foam must contain a great amount of closed cells for mechanical strength. It is only JSP Corporation of Japan throughout the world that successfully commercially produces a pellet-type foam from a non-crosslinked polypropylene resin. However, while it is recognized that the pellet-type non-crosslinked polypropylene foam having lower melting point are highly valuable owing to its easy molding and excellent recycling, a pellet-type non-crosslinked polypropylene foam having a melting point of 140° C. and less has not yet been produced.

Therefore, an object of the present invention is to provide a pellet-type polypropylene resin foam with a melting point of 140° C. or less which is produced from a non-crosslinked polypropylene resin to ensure a recyclability, has a high content of closed cells to provide a satisfactory mechanical strength and can be molded into various shaped packaging materials, and a method for producing the same. The inventors have successfully produced pellet-type foams of non-crosslinked polypropylene with a melting point of 125 to 140° C., which comprises about at least 40% of closed cells by providing a tandem extruder with a plurality of temperature zones having specifically varied temperatures, making the non-crosslinked polypropylene resin melt having a melting point of 138 to 140° C. flow through the temperature zones, mechanically homogenizing the polypropylene resin melt passed through such zones at a lower temperature of 120 to 130° C., expanding the homogenized melt through a plurality of holes formed in the dies under pressure, and cutting expanded foams discharged from the holes of the dies.

In one aspect, the present invention provides a pellet-type non-crosslinked polypropylene foam having a melting point of 125 to 140° C.

In another aspect, the present invention provides a method for preparing a pellet-type non-crosslinked polypropylene foam having a melting point of 125 to 140° C., comprising steps of; (a) extruding a non-crosslinked polypropylene random copolymer having a melting point of 138 to 140° C. through a tandem extruder; the tandem extruder consisting of the first extruder divided into the first temperature zone in which a temperature of 147 to 153° C. is set, the second temperature zone in which a temperature of 167 to 172° C. is set, the third temperature zone in which a temperature of 168 to 172° C. is set, the fourth temperature zone in which a temperature of 218 to 225° C. is set, the fifth temperature zone in which a temperature of 197 to 203° C. is set and the sixth temperature zone in which a temperature of 188 to 193° C. is set, the second extruder divided into the first temperature zone in which a temperature of 167 to 173° C. is set, the second temperature zone in which a temperature of 147 to 152° C. is set, the third temperature zone in which a temperature of 142 to 147° C. is set, the fourth temperature zone in which a temperature of 137 to 141° C. is set, the fifth temperature zone in which a temperature of 137 to 142° C. is set and the sixth temperature zone in which a temperature of 132 to 137° C. is set, and a guide, connecting the first extruder with the second extruder, in which a temperature of 248 to 255° C. is set; (b) compulsorily flowing the extruded material at a temperature of 125 to 140° C. by pumping; (c) homogenizing the extruded material at a temperature of 120 to 130° C.; (d) expanding the homogenized material through a dies; and (e) cutting the expanded material to obtain the pellet-type foams.

In another aspect, the present invention provides a device for producing a pellet-type non-crosslinked polypropylene foam having a melting point of 125 to 140° C.

In another aspect, the present invention provides articles molded from pellet-type non-crosslinked polypropylene foams having a melting point of 125 to 140° C.

BRIEF DESCRIPTION OF THE DRAWINGS

The above and other objects, features and other advantages of the present invention will be more clearly understood from the following detailed description taken in conjunction with the accompanying drawings in which.

Similar reference numbers refer to similar parts throughout several views of the drawings.

BEST MODE FOR CARRYING OUT THE INVENTION

Figure 1:
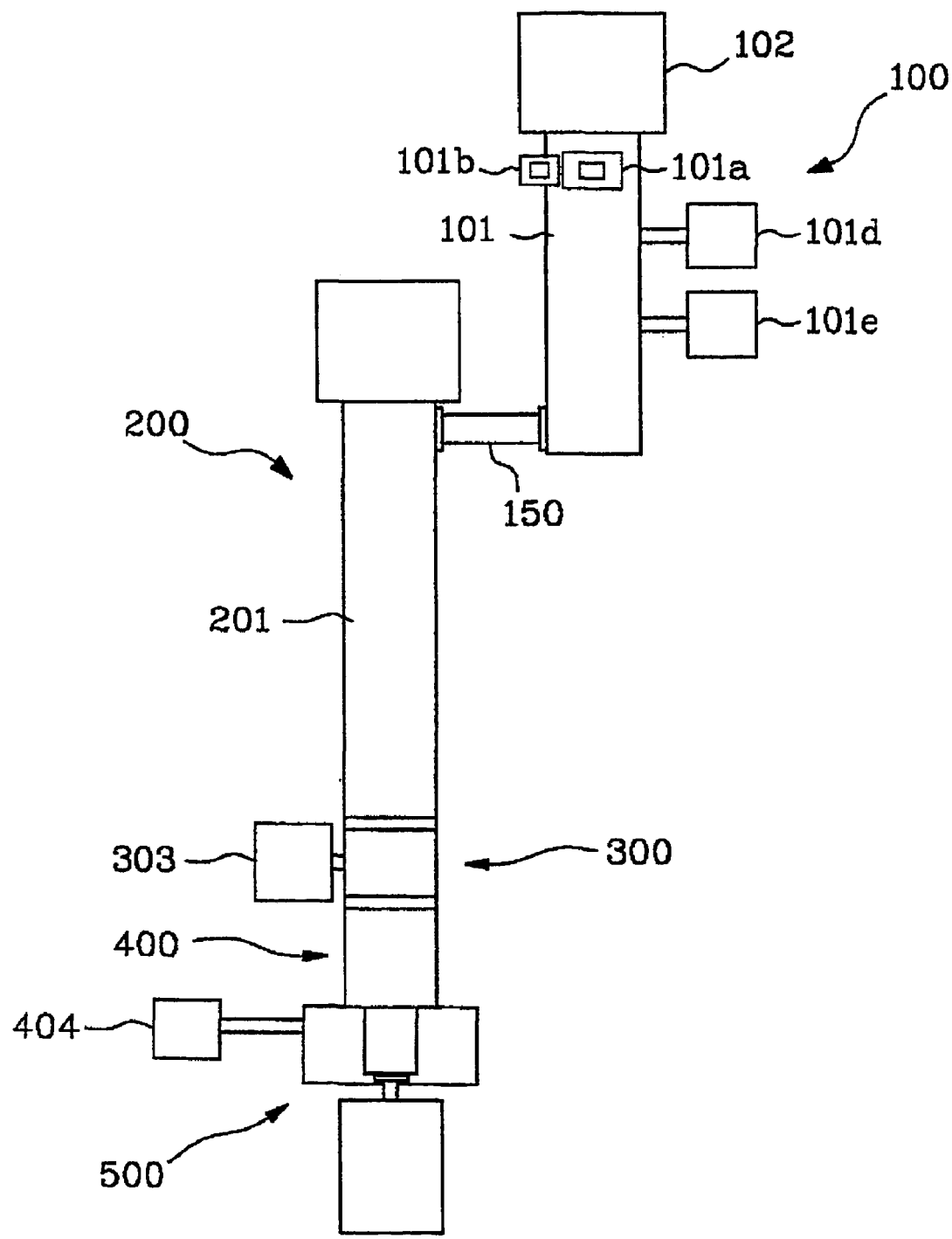
FIG. 1 is a view showing the overall structure of the device for producing pellet-type foams of non-crosslinked polypropylene according to the present invention.

Prior to the present invention, it has been impossible to prepare pellet-type foams having a melting point of 140° C. or less. Pure polypropylene whose melting point is 138° C. could not be processed at a temperature of 138° C. or less, since it would be cured rapidly at its melting point or less. Thus, it has been also considered as being impossible to prepare pellet-type foams having a melting point of 140° C. or less.

However, the inventors have developed the pellet-type non-crosslinked polypropylene foams which have a melting point of 140° C. or less and an open cell content of about 20% or less. Such pellet-type foams have been developed by combination and application of a number of discoveries. For example, the inventors have found that the content of open cells in foams can be remarkably decreased by using a tandem extruding method as a basis, setting specific temperature conditions for the first and second extruding process, and homogenizing the melt resulting from the extruder at a lower temperature of 125 to 130° C. Also, the inventors have found that only when the temperature during the extrusion and expansion of the non-crosslinked polypropylene resin having a melting point of 138 to 140° C. is kept within a specific temperature range, closed cells of 80% or more can be formed. Further, the inventor have found that a melting point of the foams prepared from the non-crosslinked polypropylene resin having a melting point of 138 to 140° C. can be lowered to 138° C. or less by the specific working conditions according to the present invention.

Now, the method for preparing the pellet type foams of non-crosslinked polypropylene according to the present invention will be described in detail. The manufacturing method of the present invention comprises extruding, pumping, homogenizing, expanding and pelletizing steps.

(1) Extruding

An extruding process according to the present invention can be performed by using a tandem extruder that is commonly used and well known in the art for preparing foams as a basis or its variation. Materials used for preparing the pellet type foams of non-crosslinked polypropylene according to the present invention comprises a non-crosslinked polypropylene random copolymer having a melting point of 138 to 140° C., a nucleating agent, a foaming agent and an additive, if necessary.

The basic resin of the present invention is the non-crosslinked propylene random copolymer having a melting point of 138 to 140° C. Examples of other comonomer copolymerizable with propylene include ethylene, 1-butene, 1-pentent and 1-hexene. The propylene random copolymer can be bipolymers such as propylene-ethylene random copolymer or propylene-butene random copolymer or terpolymers such as propylene-ethylene-butene copolymer. The ratio of other comonomer component other than propylene in the copolymer is preferably 0.05 to 10% by weight.

The nucleating agent functions to disperse a foaming agent and adjust the cell size of the foams. Examples of the nucleating agent which can be used in the present invention include, but are not limited to, sodium bicarbonate, sodium carbonate, potassium bicarbonate, potassium carbonate, ammonium bicarbonate or ammonium carbonate. Sodium bicarbonate is preferred. The more amount of the used nucleating agent is, the smaller the cell size of the foams is. On contrary, the less amount of the used nucleating agent is, the larger the cell size of the foams is. In the present invention, the nucleating agent of 0.1 to 0.4% based on the weight of a resin is used. When the amount of the used nucleating agent exceeds 0.4%, insufficient dispersion or agglomeration can occur, and as a result, the cell grows larger than a predetermined size. On the contrary, when the amount of the used nucleating agent is 0.1% or less, the nucleation activity is excessively weak, whereby the cell diameter can not be reduced.

As a usable foaming agent in the present invention, there are organic foaming agents and inorganic foaming agents. Examples of the organic foaming agent are aliphatic hydrocarbons such as propane, butane, hexane and heptane, alicyclic hydrocarbons such as cyclobutane and cyclopentane, and halogenated hydrocarbons such as chlorofluorometnae, trifluorometane, 1,1-difluoroetnae, 1,2,2,2-tetrafluoroetane, methyl chloride, ethyl chloride and methylene chloride. Also, usable organic foaming agents include dichlorotetrafluoroethane, trichlorotrifluoroethane, trichloromonofluoromethane, dichlorodifluoromethane, dichloromonofluoromethane and dibromotetrafluoroethane. Considering forming workability, nontoxicity and flame retardancy, these fluoro-chlorinated hydroncarbon are preferable. These organic foaming agents can be used alone or as a mixture of two or more thereof. Examples of the inorganic foaming agent include nitrogen, carbon dioxide, argon and air. These inorganic foaming agents can be used alone or as a mixture of two or more thereof. Also, any mixtures of randomly selected two or more of the organic foaming agents and the inorganic foaming argents can be used. The most preferred foaming argent is an inorganic foaming agent since they do not destroy an ozonosphere and are inexpensive. The used amount of the foaming agents depends upon the expansion ratio of the foam pellet to be obtained and the type of the used resin and foaming agent. The amount of the foaming agent used in the present invention is about 0.1% to 0.4% by weight, based on the weight of the resin.

In addition, various kinds of additives can be used. Examples of such additives include an antioxidant, UV absorber, flame retardant, coloring agent, dye, metal deactivator and the like. These additives can be used in an amount of 0.1 to 0.3% by weight, based on the weight of the copolymer resin. In a preferred embodiment of the present invention, paraffin wax is used. This helps the copolymer resin to flow and acts as an antistatic agent to remove static electricity of the copolymer resin. The used amount of paraffin wax is about 0.1% by weight.

The above materials used in the present invention are extruded by the tandem extruder in which a specific physical condition is set according to the present invention and the process will be described as follows. The tandem extruder is consisted of a first extruder, a second extruder and a guide connecting the first and second extruders. A screw compression ratio is generally 3:1. Usually, the inner diameter of a cylinder of the first extruder is about 60 to 70 mm. The inner diameter of a cylinder of the second extruder is normally about 90 to 95 mm.

The first extruder is divided into six zones according to their temperatures, each zone corresponds to 300 to 400 LD. The six zones are a first temperature zone of 148 to 153° C., a second temperature zone of 167 to 172° C., a third temperature zone of 167 to 172° C., a fourth temperature zone of 218 to 223° C., a fifth temperature zone of 197 to 203° C., and a sixth temperature zone of 188 to 193° C.

The non-crosslinked polypropylene random copolymer resin and the nucleating agent are supplied at a constant speed through a hopper and then melted in the first temperature zone in which a temperature of 148 to 153° C. is set. The flowing speed can be adjusted by a rotating speed of the screw and is normally about 20 to 30 rpm. Such rotating speed of the screw determines an inflow speed of row material and a flow speed of melt. In this case, an inflow speed of the resin is about 25 km/hour. Though the copolymer resin and the nucleating agent can be supplied through one hopper at the same time, it is preferable that they are supplied independently via individual hoppers. The second and third temperature zones are maintained at a temperature of 167 to 172° C., other additives such as paraffin wax are introduced to an starting point of the third temperature zone. The paraffin wax is pumped to be introduced after it is melted. Also, the temperature of the fourth temperature zone is set to 218 to 223° C. and a foaming agent is supplied to an starting point of the fourth temperature zone by pumping operation. The melt from the fourth temperature zone is passed through the fifth temperature zone in which a temperature of 218 to 223° C. is set and then introduced to the sixth temperature zone in which a temperature of 188 to 193° C. is set.

The melt from the sixth temperature zone of the first extruder is introduced to the second extruder through the guide connecting the first and second extruders. Here, the temperature of the guide is set to 248 to 255° C. and LD of the guide is 300 to 400 mm.

The second extruder is also divided into six zones according to a temperature, each zone corresponds to 470 to 520 mm. The six zones are a first temperature zone of 168 to 173° C., a second temperature zone of 147 to 152° C., a third temperature zone of 143 to 147° C., a fourth temperature zone of 137 to 142° C., a fifth temperature zone of 137 to 142° C., and a sixth temperature zone of 132 to 137° C. A screw speed of the second extruder is normally 8 to 12 rpm.

Each zone in the first and second extruders can be maintained at a specifically set temperature by means of any one of water-cooled type, oil-cooled type and air-cooled type method. Among them, the water-cooled method that adjusts a temperature using water pressure is preferable. For example, a water cooled type device can be used, which has a cooling water body which is formed in a hollow shape, so that it can be mounted around the cylinder of the extruder and the cylinder is inserted therein, and is provided with a cooling water passage formed integrally with the body, so that cooling water is contacted directly with the surface of the cylinder.

(2) Pumping

The sixth temperature zone of the second extruder can correspond to a flange for connecting a means for crushing the melt according to a method of the present invention. Since the temperature of this flange is maintained peculiarly at 132 to 137° C. by the present invention and this temperature is lower than the melting point of 138° C. of the polypropylene resin, an flowing speed of the melt can be remarkably lowered. Thus, there is need for forcibly flowing the melt so that it can move smoothly. Such compulsory flow can be achieved by means of a pump. At this time, the temperature is maintained at 125 to 138° C. by the water-cooled type device.

(3) Homogenizing

According to the present invention, the melt transferred from the extruder by pumping at a temperature of 125 to 140° C. is homogenized at a temperature of 120 to 130° C. Here, to homogenize means that the melt is cut and ground at the same time in a manner of grinding stones. Also, through homogenization, the melt becomes to have a uniform temperature in the inner portion and outer portion. In the course of homogenization, the temperature in the cylinder is kept at 120 to 130° C., preferably by a water cooling type or oil cooling type method, more preferably oil cooling type method. At this time, the pressure inside the cylinder reaches about 120 kg/cm$^2$.

(4) Expanding

The homogenized melt is expanded through dies. As described above, since a pressure inside the cylinder in which the melt are homogenized reaches about 120 kgf/cm$^2$, a decompression means is installed at the dies to maintain a pressure of 0.3 to 0.7 kgf/cm$^2$. The polypropylene resin is expanded through holes of the dies. Here, a diameter of each hole is normally 0.5 to 1.0 mm, and an expansion ratio is normally five times of a diameter of the micro hole.

(5) Pelleting

The foams formed by expansion through the holes of the dies are discharged and simultaneously cut by cutting members to produce pellet type foams.

A device for producing the pellet-type foams of non-crosslinked polypropylene which have a melting point of 125 to 140° C. according to the present invention comprises a first extruder, a second extruder connected to the first extruder, a pumping part connected to the second extruder, a homogenizing part connected to the pumping part and a dies part connected to the homogenizing part The first extruder comprises a cylindrical cylinder having a screw shaft rotatably mounted therein, a driving means disposed at an end of the cylinder for rotating the screw shaft and a plurality of cooling means and heating means disposed on an the circumference surface of the cylinder and is provided with inlets for supplying a polypropylene and a nucleating agent to the cylinder in an end portion of the cylinder near the driving means is and inlets for supplying an additive such as an antistatic agent and a foaming agent in a proper middle portion of the cylinder and an outlet at the other end portion of the cylinder. The polypropylene and a nucleating agent supplied to the cylinder via the inlet are transfered compulsorily toward the outlet by the screw shaft which is rotated by the driving means.

The second extruder connected to the first extruder by a guide comprises a cylinder to which the polypropylene melt discharged from the cylinder of the first extruder is supplied through the guide, and a plurality of cooling means and a heating means mounted to the outer circumference surface of the cylinder for adjusting a temperature of the melt in the cylinder.

The pumping part for moving compulsorily the polypropylene melt discharged from the second extruder to the next device comprises a casing having an inner space to which the polypropylene melt discharged from the cylinder of the second extruder is supplied, a pair of gears rotatably installed in the casing, the gears being engaged with each other, and a driving means for rotating the gears.

The homogenizing part comprises a cylindrical first housing to which the polypropylene melt discharged from the cylinder of the pumping part is supplied, the first housing being rotatably installed rotatably, a driving means for rotating the first housing, a screw connected to a discharging end of the first housing, a second housing located on a circumference part of the screw, a frame mounted to an outer circumference of the second housing for forming an airtight space between the second housing and the frame. A spiral space is formed between the screw and the second housing along the entire length of the screw and the polypropylene melt discharged from the first housing is flow therethrough to be discharged and discharged to the outside. A heat transfer fluid oil flows in a space formed between the second housing and the frame to adjust a temperature of the polypropylene melt which flows through the second housing.

The homogenizing part comprises a homogenizing means that crushes uniformly the polypropylene melt. The homogenizing means is composed of a rotating plate rotatably mounted and a fixing plate disposed to be contacted with the rotating plate. The rotating plate is provided with a plurality of slits arranged radially and the fixing plate is provided with a plurality of circular holes. The polypropylene melt introduced to the homogenizing part arrives at the rotating plate and is cut by an edge of each opening of the rotating plate while it passes through the rotating plate. Then, the cut polypropylene melt is ground by the rotating plate in the space between the rotating plate and the fixing plate.

The ground polypropylene melt discharged from the homogenizing part is supplied to the dies part including a discharging part, a cutting part and a driving means, in which the expanded foams are cut into a predetermined dimension.

In the present invention, the cooling means mounted to the cylinders of the first or second extruder has a closed casing through which cooling water supplied from the outside flows. The cooling water introduced to the inside of the casing flows through the casing while being in contact with the surface of the cylinder whereby the temperature of the polypropylene melt that flows within the cylinder is reduced. The heating means disposed between two casings employs a heater having a heating coil installed therein.

The cylinder of the first extruder is divided into six temperature zones according to a temperature condition which the polypropylene melt flowing in the cylinder should satisfy. A temperature of each zone is adjusted by the cooling means or heating means mounted on the outer circumference of the cylinder. A temperature of the polypropylene melt should be kept at 147 to 153° C. in the first temperature zone, at 167 to 172° C. in the second temperature zone, at 168 to 172° C. in the third temperature zone, at 218 to 225° C. in the fourth temperature zone, at 197 to 203° C. in the fifth temperature zone and at 188 to 193° C. in the sixth temperature zone.

The cylinder of the second extruder is also divided into six temperature zones according to a temperature condition which the polypropylene melt flowing in the cylinder should satisfy. A temperature of each zone is adjusted by the cooling means or heating means mounted on an outer circumference of the cylinder. A temperature of the polypropylene melt should be at 167 to 173° C. in the first temperature zone, at 147 to 152° C. in the second temperature zone, at 142 to 147° C. in the third temperature zone, at 137 to 141° C. in the fourth temperature zone, at 137 to 142° C. in the fifth temperature zone and at 132 to 137° C. in the sixth temperature zone.

The guide connecting the first extruder and the second extruder should be kept at a temperature of 248 to 255° C.

The two gears disposed in the inner space of the casing of the pumping part rotate in opposite directions from each other toward a center of the inner space to make the polypropylene melt move compulsorily to a next process position. Also, the first housing of the homogenizing part is rotatably supported on supporting plates by a plurality of bearing blocks. A drive sprocket of a driving means is geared with a driven sprocket fixed to an outer circumference surface of the first housing so that the first housing is rotated in response to the operation of the driving means.

The discharging part of the dies part includes a hollow guide bar and a cylinder located outside of the guide bar. The guide bar has a plurality of cavities formed on the outer circumference thereof in a longitudinal direction of the guide bar. The polypropylene melts discharged from the homogenizing part flows through each cavity. A plurality of through holes are formed at portions of the cylinder corresponding to the cavities, respectively.

The cutting part of the dies part includes a supporting plate located at a rear side of the discharging part and cutting member fixed to the supporting plate and movably located outside of the cylinder. The cutting member is provided with a plurality of through holes formed at positions corresponding to the plurality of through holes on the cylinder, respectively. The driving means comprises an eccentric cam being able to rotate by a motor, a crank connected to the eccentric cam and rotating in response to the rotation of the cam, and a power converting and transmitting means connected to the crank for converting a rotating movement of the crank into a linear movement and transmitting the linear movement to the supporting plate to which the cutting member is fixed, whereby the cutting members are reciprocated along the outer circumference of the cylinder by the operation of the driving means and the foams expanded from the through holes of the cylinder are cut by edges of the through holes of the cutting member.

Meanwhile, the cylinder provided with a plurality of grooves formed in a longitudinal direction on predetermined position thereof. Each groove has a reciprocating rod which is movably located therein and has one end fixed to the supporting plate. A cutting member is fixed to each reciprocating rod by a fixing means and is reciprocated on an outer circumference of the cylinder by the reciprocating rod which is reciprocated along each groove of the cylinder.

Now, a particular structure and operation of the device for producing pellet-type foams according to the present invention will be described in more detail taken in conjunction with the accompanying drawings.

FIG. 1 is a view showing an overall structure of a device for producing the pellet-type foams according to the present invention. The device for producing foams according to the present invention comprises the first extruder 100, the second extruder 200 connected to the first extruder 100 via a guide 150, a pumping part 300 connected to the second extruder 200, a homogenizing part 400 connected to the pumping part 300 and a dies part 500 for forming a foam mixture discharged from the homogenizing part 400 into pellet-type foams. Hereinafter, respective parts as mentioned above will be described individually.

A. First extruder 100.

Figure 2:
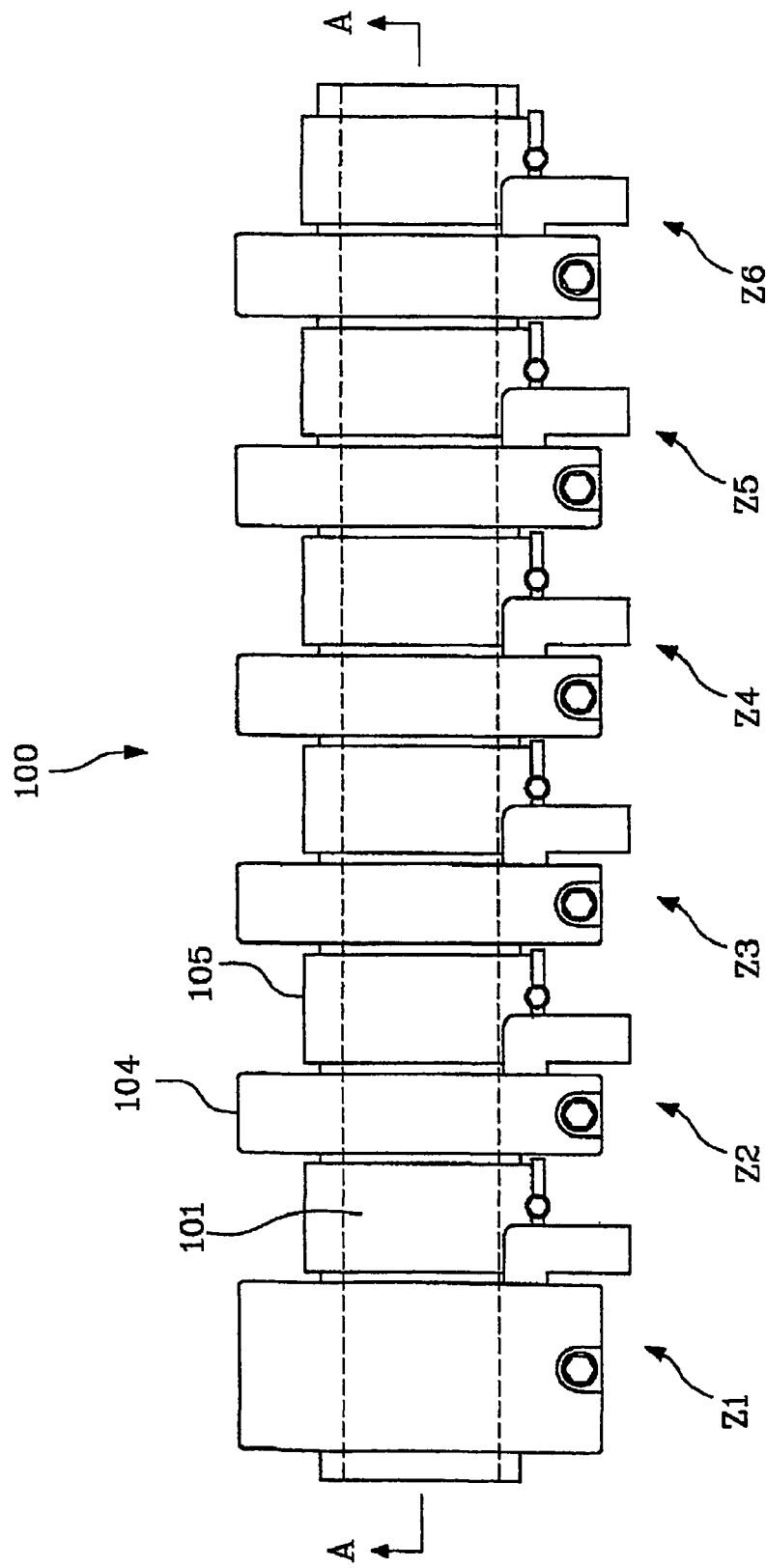
FIG. 2 is a plan view showing a cylinder of the first extruder shown in FIG. 1.
Figure 3:
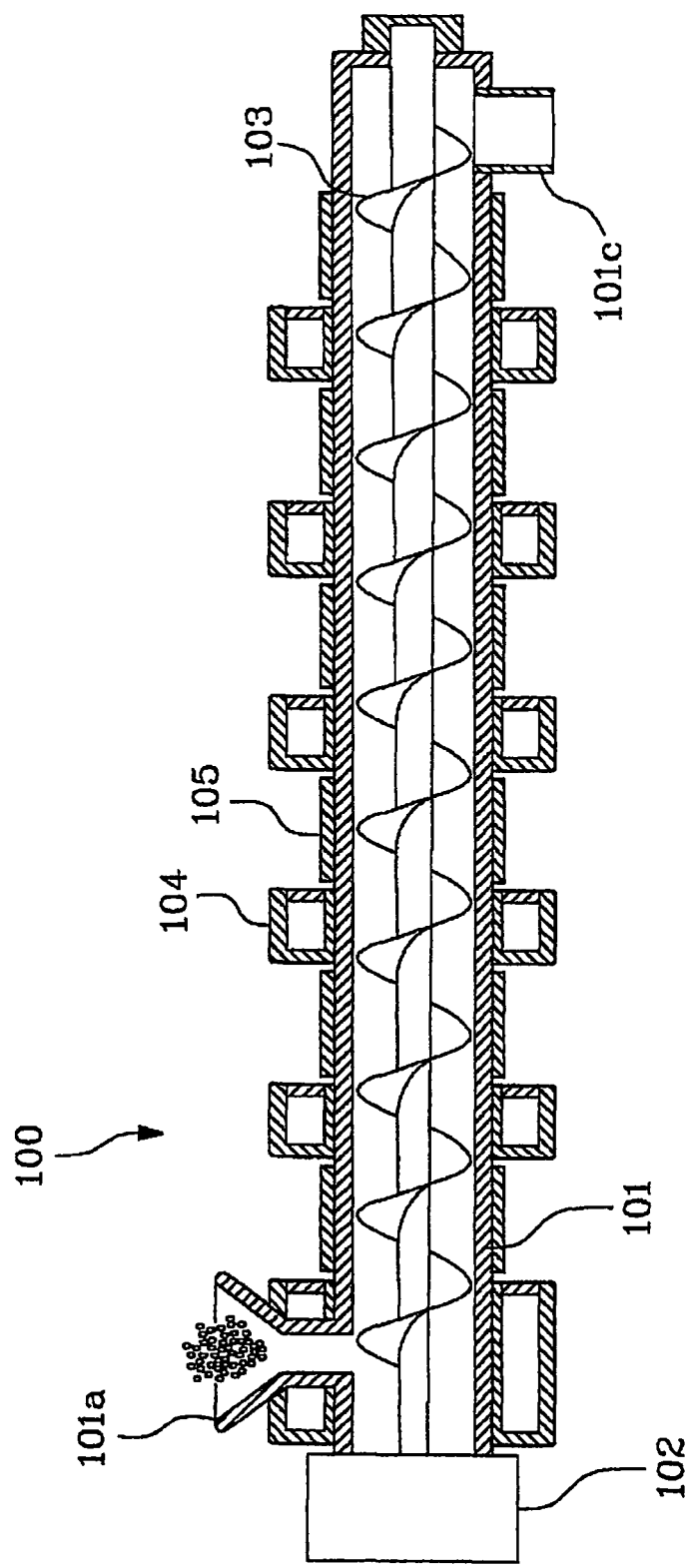
FIG. 3 is a sectional view taken along the line A—A in FIG. 2.

FIG. 2 is a plan view showing a cylinder of the first extruder 100 shown in FIG. 1 and FIG. 3 is a sectional view taken along the line A—A in FIG. 2. These figures show a structure of the first extruder 100. The first extruder 100 comprises a cylindrical cylinder 101 having a certain length, a driving means 102 installed at an end of the cylinder 101, a screw shaft 103 mounted in the cylinder 101 and being able to rotate by the driving means 102, and a cooling means 104 and heating means 105 installed on the outer circumference surface of the cylinder 101.

At an end portion of the cylinder 101 near the driving means 102, entrances 101a, 101b (only one entrance 101a is shown in FIG. 3 which is a sectional view) for supplying a row polypropylene and a nucleating agent (for example, sodium bicarbonate) to the cylinder 101, respectively, are formed. An exit 101c is formed at another end portion of the cylinder 101. Also, at a middle portion of the cylinder 101, an entrance 101d for supplying an antistatic agent (for example, paraffin wax) and an entrance 101e for supplying a foaming agent (for example, LPG or $CO_2$) are formed.

On the other hand, an interior of the cylinder 101 is divided into six temperature zones according to temperature conditions of the polypropylene that is supplied to the cylinder 101. The cooling means 104 and the heating means 105 are mounted to the outer circumference surface of the cylinder 101 at positions corresponding to respective temperature zones for adjusting the temperature of the polypropylene melt.

FIG. 2 is a plan view showing the cooling means 104 and the heating means 105 mounted on the outer circumference surface of the cylinder 101 of the first extruder 100 shown in FIG. 1. Now, the cooling means and heating means will be explained in detail referring to FIG. 3.

The cooling means 104 mounted on the outer circumference surface of the cylinder 101 corresponding to each zone has an airtight casing with a donut shape, through which a cooling water supplied from an outside flows. The cooling water introduced to the casing 104 flows through the casing 104 while being in contact with the surface of the cylinder 101. Therefore, the temperature inside the cylinder 101, that is, the temperature of the polypropylene melt that flows therein can be lowered.

The heating means 105 mounted between two casings 104 (that is, cooling means) is a heater in which a heating coil is installed. The heating means raise the temperature of the polypropylene melt which has been already lowered by the cooling means 104 to a predetermined temperature.

The function of the first extruder 100 having a structure as described above will be described with reference to respective drawings. As the driving means 102 is activated, polypropylene and a nucleating agent are supplied to the cylinder 101 through the entrances 110a, 101b, respectively. The screw shaft 103 is rotated in the cylinder 101 by the action of the driving means 102 (of course, a rotating speed of the screw shaft is lowered by a speed reducer, as compared with a rotating speed of the driving means), whereby the polypropylene and the nucleating agent supplied to the cylinder 101 are melted and mixed while simultaneously being moved compulsorily toward the other end of the cylinder 101.

In the process as described above, an antistatic agent and a foaming agent are supplied to the cylinder 101 through another entrances 101d, 101e formed at a mid portion of the cylinder 101 to be mixed with a polypropylene melt.

As described above, the cylinder 101 of the first extruder 100 is divided into six temperature zones Z1 to Z6 according to the temperature condition of the polypropylene melt which flows therein as shown in FIG. 2. Each of the temperature zones Z1 to Z6 has a length of about 300 to 400 mm. In a preferred aspect, the cylinder 101 has an inner diameter of 65 mm and LD of about 358 mm and the temperature condition and other conditions of the polypropylene melt according to each temperature zone Z1 to Z6 of the cylinder are as follows.

1) First temperature zone Z1: A zone to which the polypropylene and the nucleating agent are supplied, kept at a temperature of 150° C., a length for which the above temperature is maintained, that is, a length of the first temperature zone Z1 is 360 mm.
2) Second temperature zone Z2: The polypropylene melt flowing through the second temperature zone Z2 is maintained at a temperature of 170° C.
3) Third temperature zone Z3: The polypropylene melt flowing through the third temperature zone Z3 is maintained at a temperature of 170° C. which is the same as in the second temperature zone Z2. Paraffin wax as an antistatic agent is supplied to the third temperature zone Z3.
4) Fourth temperature zone Z4: The polypropylene melt flowing through the fourth temperature zone Z4 is maintained at a temperature of 220° C. CO$_2$ or LPG as a foaming agent is supplied to the cylinder 101 at the fourth temperature zone Z4.

5) Fifth temperature zone Z5: The polypropylene melt flowing through the fifth temperature zone Z5 is maintained at a temperature of 200° C.

6) Sixth temperature zone Z6: The polypropylene melt is maintained at a temperature of 190° C.

In order to meet the temperature conditions of the polypropylene melt at respective temperature zones Z1 to Z6, the cooling means 104 and the heating means 105 mounted on the temperature zones are properly operated. That is, the temperatures of the polypropylene melt at the respective temperature zones Z1 to Z6 are adjusted to meet the condition described above by controlling an amount and a temperature of a coolant supplied to the casing of the cooling means 104 or a current applied to the heating wire constituting the heating means 105 and a time to apply a current.

Figure 4:
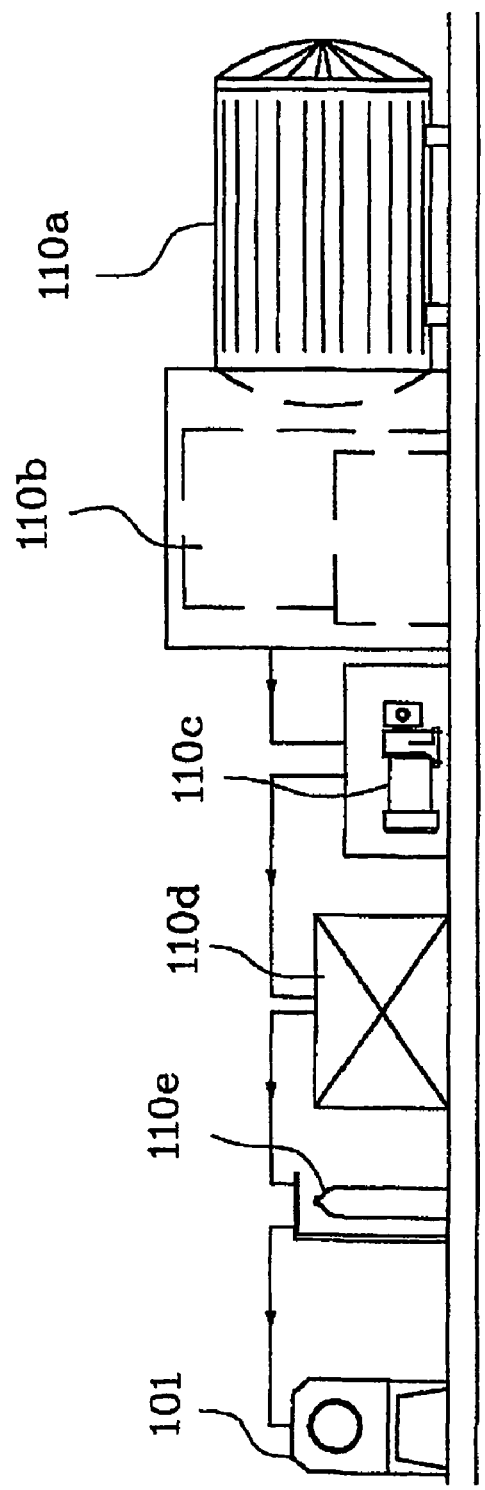
FIG. 4 is a schematic view showing the structure of the device for supplying $CO_2$.

On the other hand, in the case of using CO$_2$ as a foaming agent which is supplied to the cylinder 101 of the first extruder 100, an additional device for supplying CO$_2$ is used. The device for supplying CO$_2$ used in the present invention is as follow:

Referring to FIG. 4 which is a schematic view showing a structure of the device for supplying CO$_2$, the device 110 for supplying CO$_2$ comprises a tank 110A for storing CO$_2$, an unit for vaporizing and freezing 110B, an unit for supplying CO$_2$ 110C, an unit for stabilizing 110D and a storage unit 110E. CO$_2$ stored in the storing CO$_2$ tank 110A is transferred to the unit 110B for vaporizing and freezing, in which it is converted into the vapor phase. That is, in the course of passing through a refrigerator of the unit for vaporizing and freezing 110B, CO$_2$ is gasified and vaporized, and then supplied to the unit 110D for stabilizing by a pump, the unit 110C for supplying CO$_2$. In the unit 110D for stabilizing, CO$_2$ in the form of vapor is converted to the gas phase. CO$_2$ in the gas phase is stored in the storage unit 110E. When a process is started, CO$_2$ stored in the storage unit 110E is supplied to the first cylinder 101 of the first extruder 100 described above.

The polypropylene melt which meets the temperature conditions in the temperature zones Z1 to Z6 is moved (moved by the screw shaft 103) toward an end of the cylinder 101 and then supplied to the second extruder 200 through the guide 150. The polypropylene melt passing through the guide 150 is maintained at a temperature of 250° C.

B. Second extruder 200

The second extruder 200 to which the polypropylene melt is supplied through the guide 150 has the same structure with the first extruder 100. That is, the cylinder 201 constituting the second extruder 200 is divided into six temperature zones according to the temperature condition of the polypropylene melt that flows in the cylinder 201. A cooling means and a heating means are mounted on the outer circumference surface of the cylinder 201 at positions corresponding to the temperature zone for adjusting the temperature of the polypropylene melt.

The cooling means and heating means also have the same structure with the cooling means 104 and the heating means 105 mounted on the outer circumference surface of the cylinder 101 of the first extruder 100 shown in FIG. 2. Therefore, the description on the structures of the cooling means and heating means is omitted.

The cylinder 201 of the second extruder 200 is divided into six temperature zones according to the temperature condition of the polypropylene melt which flows therein. Each temperature zone has a length of about 470 to 520 mm. In a preferred aspect, the cylinder 201 has an inner diameter of 90 mm and LD is about 495 mm. The temperature conditions of the polypropylene melt in the cylinder 201 at the temperature zones are as follows.

1) First temperature zone (the entrance portlion): 170° C.
2) Second temperature zone: 150° C.
3) Third temperature zone: 145° C.
4) Fourth and fifth temperature zones: 140° C.
5) Sixth temperature zone (the exit portion): 135° C.

C. Pumping part 300

The polypropylene melt at a temperature of 135° C. discharged from the second extruder 200 is supplied to the pumping part 300. Since the melting point of the polypropylene is 138° C., the polypropylene melt discharged from the second extruder 200 has been considerably reduced in its flowing speed. In the present invention, the pumping part 300 is used for moving compulsorily such polypropylene melt to a subsequent process.

Figure 5:
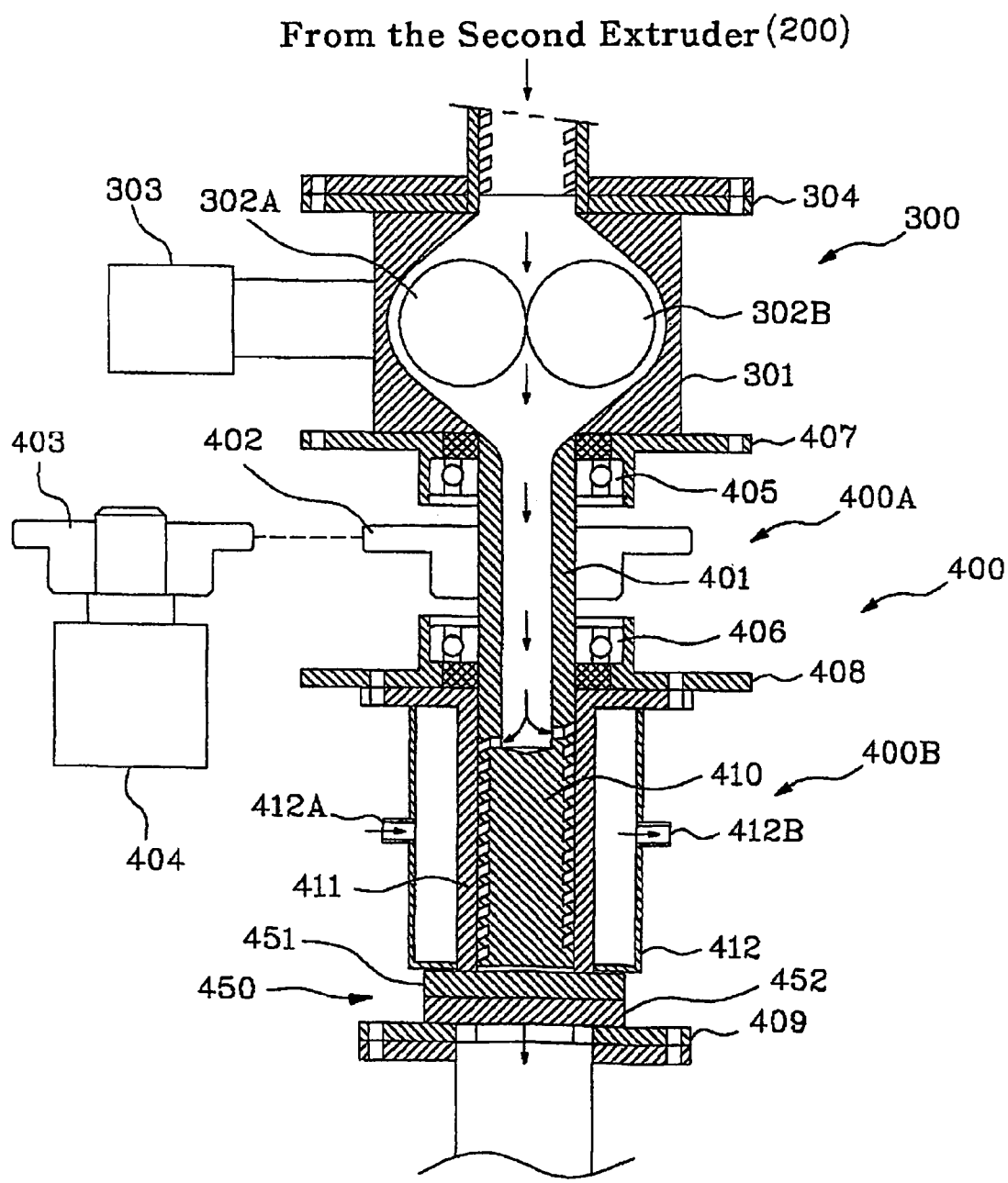
FIG. 5 is a sectional view showing the inner structure of the pumping part and the homogenizing part shown in FIG. 1.

FIG. 5 is a sectional view showing the inner structure of the pumping part 300 and homogenizing part 400 shown in FIG. 1. The left side shows the inner structure of the pumping part 300 and the right side shows an inner structure of the homogenizing part 400, respectively.

The pumping part 300 to which the polypropylene melt discharged from the cylinder 201 of the second extruder 200 is supplied comprises a casing 301 having an inner space, a pair of gears 302A and 302B engaged with each other and installed rotatably in the inner space of the casing 301, and a driving means 303 for rotating the gears 302A and 302B. An entrance portion of the casing 301 is connected to the cylinder 201 of the second extruder 200 by a flange 304.

The polypropylene melt discharged from the cylinder 201 of the second extruder 200 is supplied to the inner space of the casing 301 via the entrance portion, and then discharged compulsorily to an exit portion by the two gears 302A and 302B which rotate in opposite directions toward a center of the inner space of the casing. The polypropylene melt discharged from the cylinder 201 of the second extruder 200 has a temperature of 135° C., and a considerably reduced fluidity. Therefore, the pumping part 300 serves to compulsorily transfer the polypropylene melt to the next process.

D. Homogenizing part 400

The homogenizing part 400 connected to the exit portion of the casing 301 of the pumping part 300 is divided into a rotating part 400A and a crushing part 400B. The rotating part 400A is composed of a first housing 401 of a hollow cylindrical shape, a driven sprocket 402 fixed to the outer surface of the first housing 401 and a driving means 404 to which a driving sprocket 403 is fixed.

The first housing 401 is supported rotatably to support plates 407 and 408 through a plurality of bearing blocks 405 and 406. The drive sprocket 403 of the driving means 404 is geared with the driven sprocket 402 fixed to the outer surface of the first housing 401, whereby the first housing 401 is rotated in response to the operation of the driving means 404. An end of the first housing 401 corresponds to the exit portion of the casing 301 of the pumping part 300 and thus, the polypropylene melt discharged from the pumping part 300 flows in the first housing 401. In the first housing 401, the temperature of the polypropylene melt are varied according to the location (that is, a central portion and outer portion of the inner space of the first housing). However, since the polypropylene melt is mixed by the rotation movement of the first housing 401, the whole polypropylene melt is maintained constantly at a temperature. Here, since new polypropylene melt is supplied compulsorily and continuously by the pumping part 400, the polypropylene melt is rotated and moved at the same time.

The crushing part 400B is composed of a screw 410 connected to the exit portion of the first housing 401, a second housing 411 located on the outer circumference of the screw 410 and a frame 412 mounted on the outer circumference of the second housing 411 for forming an airtight space between the second housing 411 and the frame 412. The screw 410 is a cylindrical member having a spiral with a certain depth formed on the outer circumference surface thereof and a spiral-shaped space is formed between the screw 410 and the second housing 411 and extended to the entire length of the screw 410. Therefore, the polypropylene melt discharged from the first housing 401 of the rotating part 400A under a high pressure, is moved along the spiral-shaped space between the screw 410 and the second housing 411 and discharged out of the crushing part 400B.

Meanwhile, a heat transfer oil flows in the space formed between the second housing 411 and the frame 412. That is, an inlet port 412A through which the heat transfer oil is supplied is formed at a side of the frame 412, an outlet 412B through which the heat transfer oil is discharged is formed at the otner side of the frame 412. The heat transfer oil that introduced to the space between the second housing 411 and the frame 412 via the inlet port 412A contacts directly with the surface of the second housing 411 to adjust the temperature of the polypropylene melt that flows in the second housing 411. The heat transfer oil that flows in the space between the second housing 411 and the frame 412 to adjust the temperature of the polypropylene melt is discharged via the outlet port 412B. Processes for inflow, adjustment of temperature and discharge are proceeded continuously, whereby the temperature of the polypropylene melt which flows in the spiral-shaped space between the second housing 411 and the screw 410 is adjusted to a predetermined temperature.

At the rear end of the homogenizing part 400, that is, the exit part of the second housing 411, a homogenizing means 450 is disposed for crushing and homogenizing a mixture of the discharged polypropylene melt and a nucleating agent.

Figure 6A:
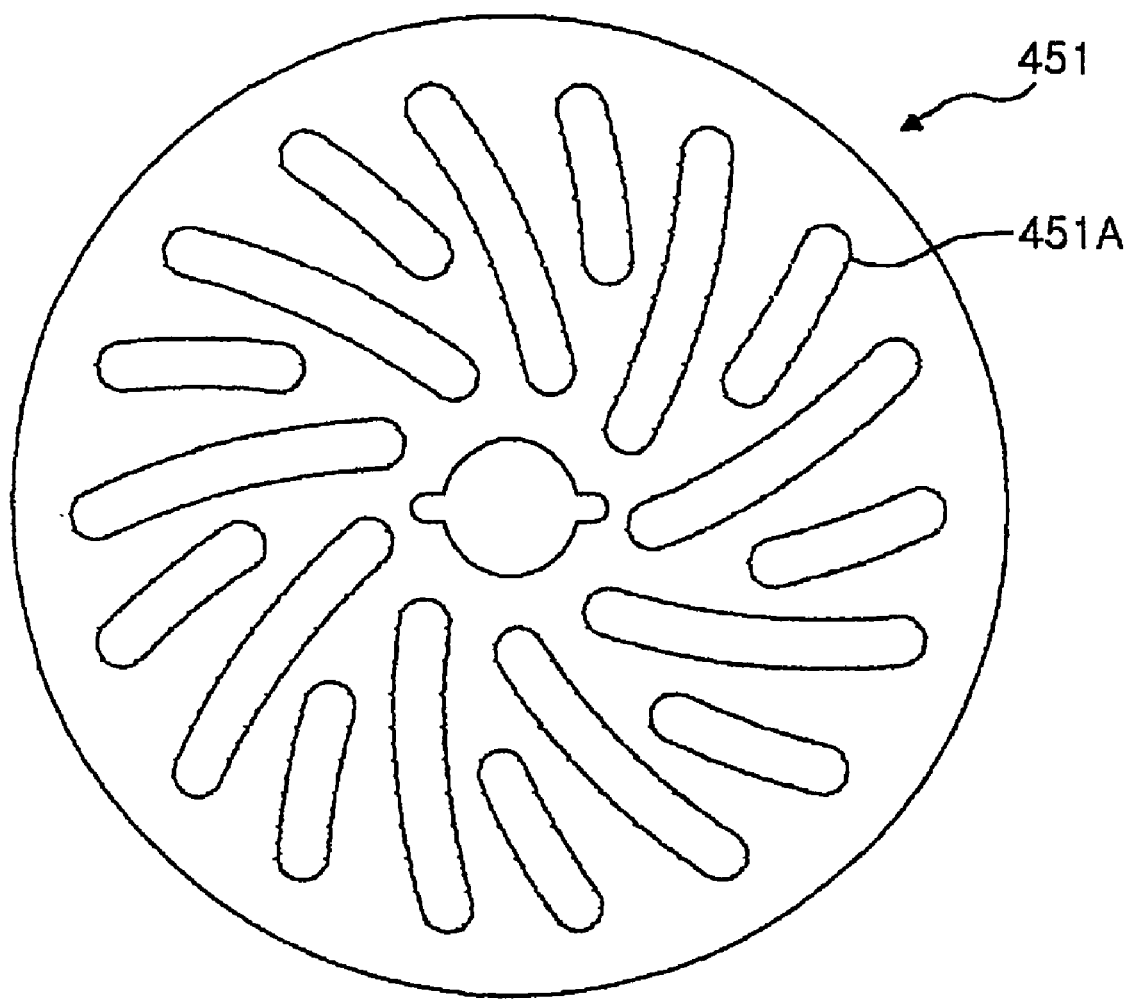
FIG. 6A and FIG. 6B are front views showing each member of the homogenizing part.
Figure 6B:
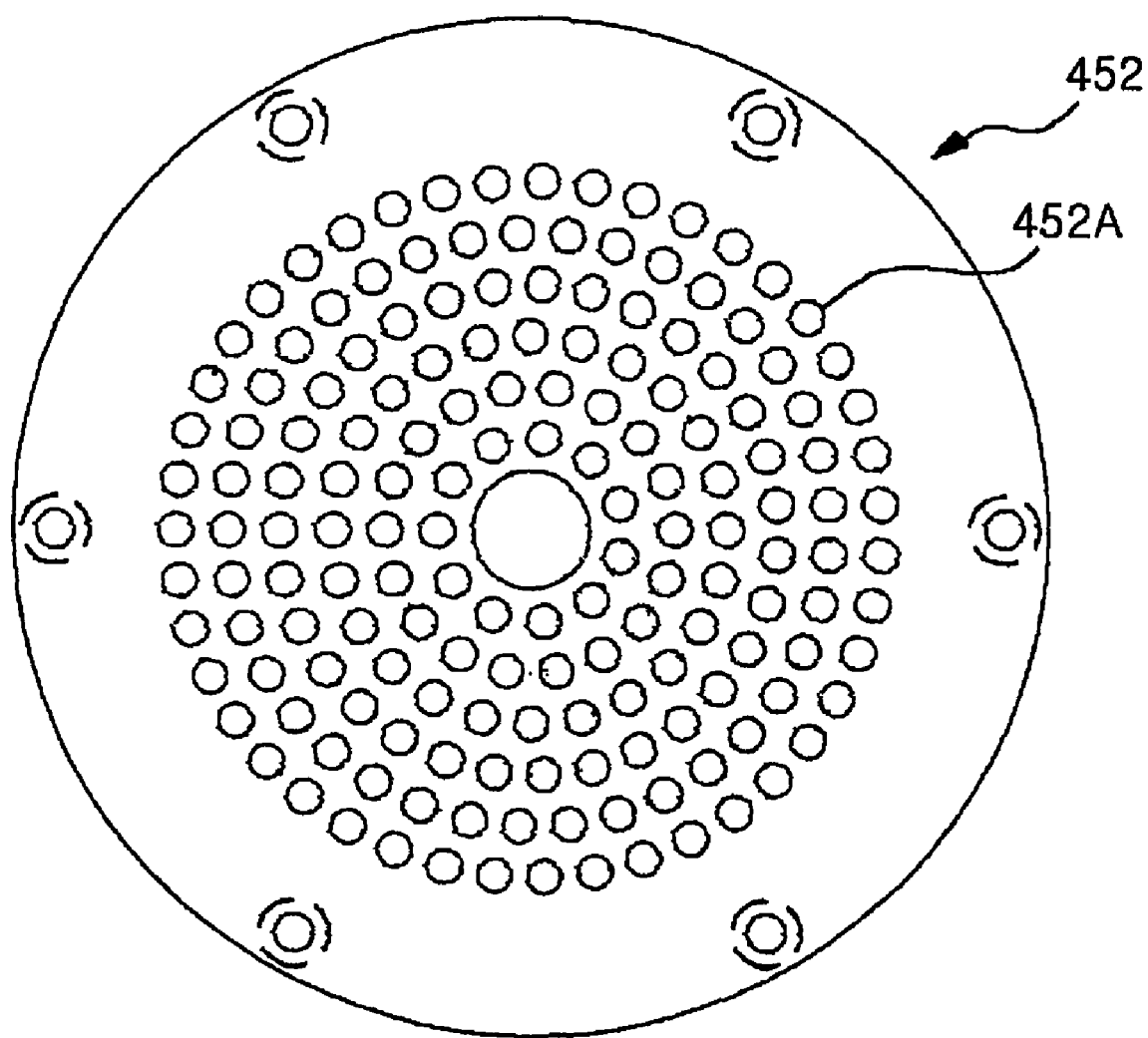

FIG. 6A and FIG. 6B are front views of a rotating plate 451 and a fixing plate 452 constituting the homogenizing means 450, respectively. The rotating plate 451 and the fixing plate 452 have same shape and are mounted in a state that they are contacted with each other, provided that the rotating plate 451 is mounted rotatably.

A plurality of openings 451A are formed radially on the rotating plate 451, each opening 451A is slanted toward a center of the rotating plate 451. Also, a plurality of circular holes 452A are formed on the fixing plate 452.

The polypropylene melt discharged from the second cylinder 411 arrives at the rotating plate 451 which is rotating and passes through each opening 451A formed on the rotating plate 451. At this point, the polypropylene melt is cut by an edge of each opening 451A, whereby all polypropylene melts are crushed homogeneously. The crushed polypropylene melt is ground by the rotating plate 451 which rotates in the space between the rotating plate 451 and the fixing plate 452 and discharged through the holes 452A of the fixing plate 452.

E. Dies part 500

The temperature-controlled polypropylene melts discharged from the homogenizing part 400 is supplied to the dies part 500 to produce pellet-type foams.

Figure 7:
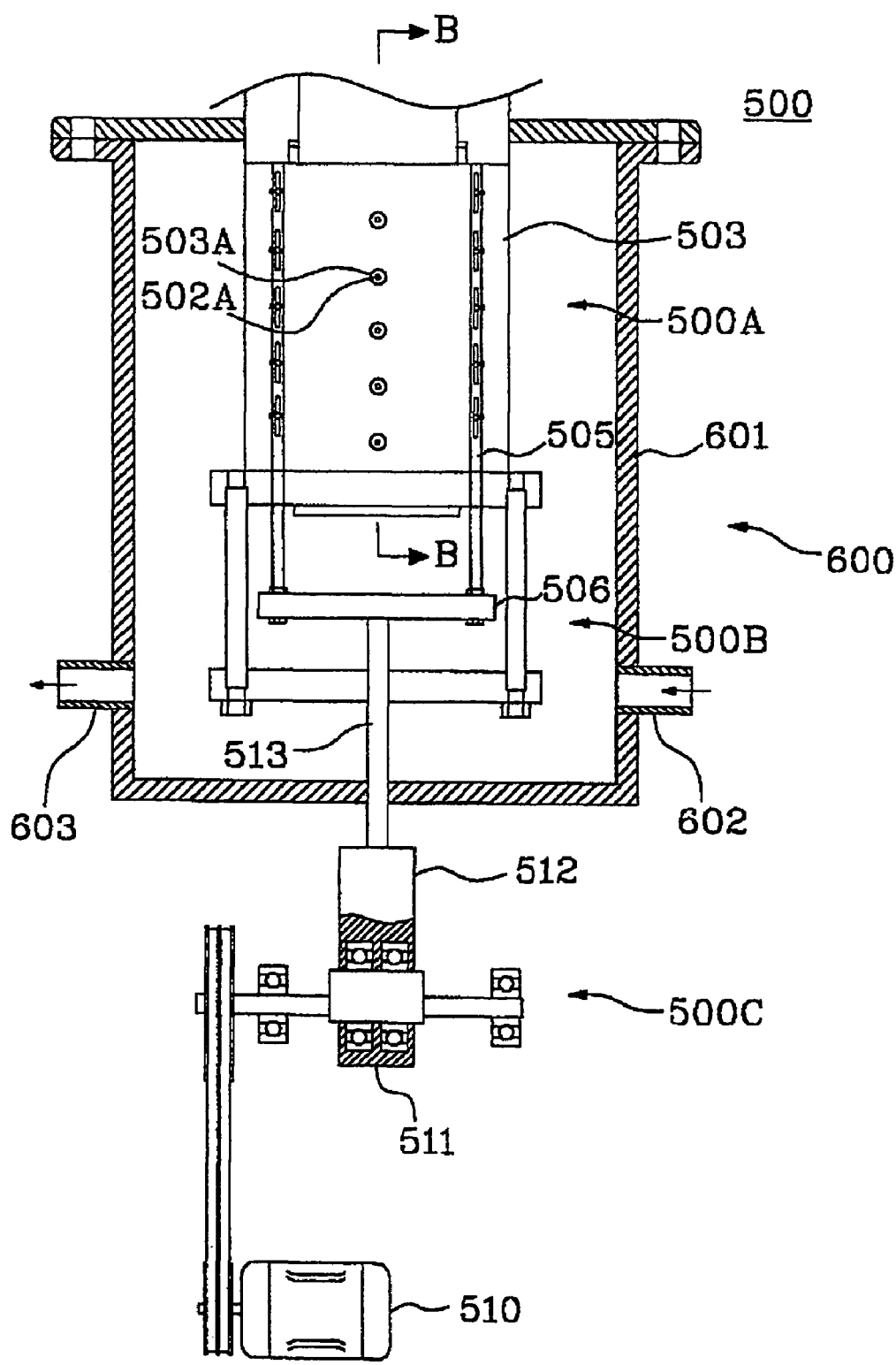
FIG. 7 is a plan view showing the structure of the die part shown in FIG. 1.
Figure 8:
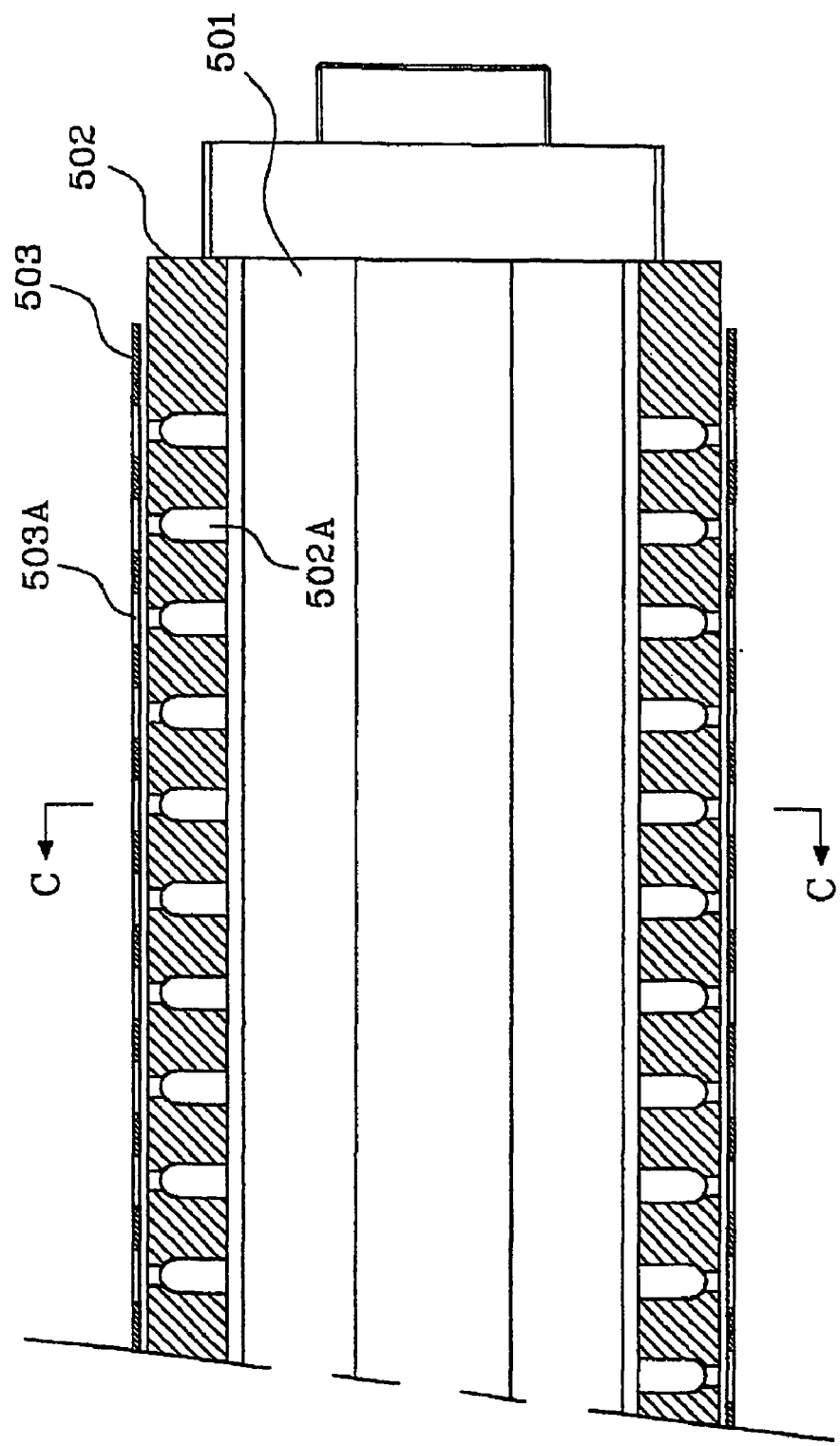
FIG. 8 is a sectional view taken along the line B—B in FIG. 7.
Figure 9:
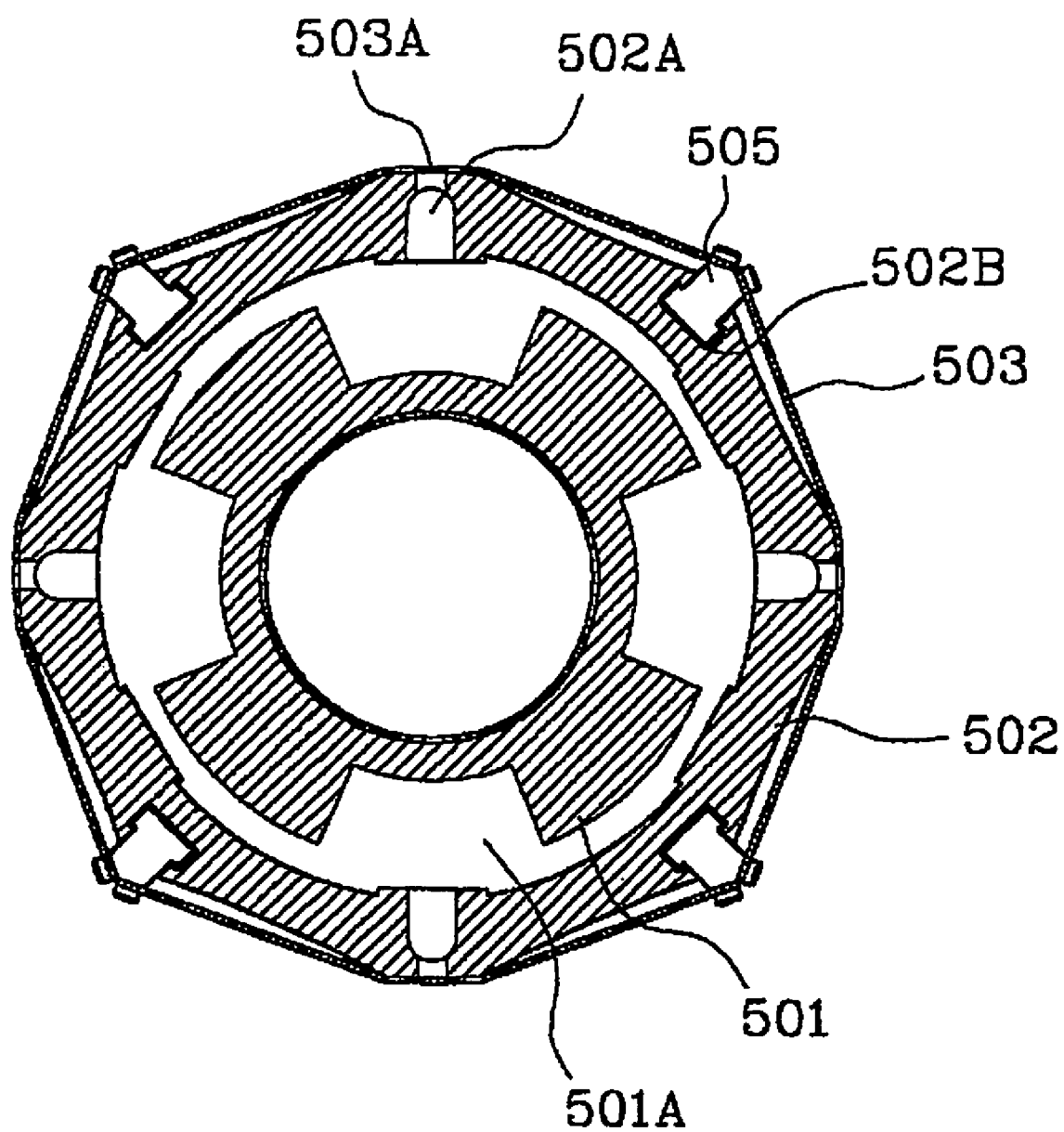
FIG. 9 is a sectional view taken along the line A—A in FIG. 8.

FIG. 7 is a plan view showing a structure of the dies part shown in FIG. 1 and FIG. 8 is a sectional view taken along the line B—B in FIG. 7, and FIG. 9 is a sectional view taken along the line C—C in FIG. 8. The dies part 500 is divided into a discharging part 500A, a cutting part 500B and a driving means 500C.

The discharging part 500A is composed of a hollow cylinder-shaped guide bar 501 and a cylinder 502 located outside the guide bar 501. On the outer circumference of the guide bar 501, a plurality of cavities 501A are formed in a longitudinal direction of the guide bar 501. The polypropylene melt discharged from the homogenizing part 400 flows in each cavity 501A. The plurality of through holes 502A are formed at portions of the cylinder 502 corresponding to the respective cavities 501A.

The cutting part 500B is composed of a supporting plate 506 located at the rear side of the discharging part 500A and a cutting member 503 fixed to the supporting plate 506. The cutting member 503 is located movably on the outside of the cylinder 502 and has a plurality of through holes 503A formed at positions corresponding to the plurality of through holes 502A of the cylinder 502, as shown in FIG. 9. As shown in figures, a diameter of the through holes 502A formed on the cylinder 502 is less than that of the through holes 503A formed on the cutting member 503. At an initial position, each through hole 502A of the cylinder 502 is located on a central portion of the corresponding through hole 503A of the cutting member 503.

Meanwhile, a plurality of grooves 502B are formed on the outer circumference of the cylinder 502 in a longitudinal direction and reciprocating rods 505 are located in the grooves 502B, respectively. The cutting member 503 is fixed to reciprocating rods 505 by fixing means such as a bolt, whereby the cutting member 503 is reciprocated on the outer circumference of the cylinder 502 by the reciprocating rod 505 which is reciprocated along the groove 502B of the cylinder 502.

The driving means 500C of the dies part 500 is composed of an eccentric cam 511 which is rotated by a motor 510, a crank 512 that is connected to the eccentric cam 511 and rotated in response to the rotation of the cam 511 and a power converting and transmitting means 513 connected to the crank 512 for converting rotation movement of the crank 512 to linear movement and transmitting the linear movement to the supporting plate 506.

Once the eccentric cam 511 is rotated by the operation of the motor 510, the rotation movement of the crank 512 is converted to the linear movement by the power converting and transmitting means 513, and then transmitted to the supporting plate 506 to which ends of reciprocating rods 505 are fixed. Therefore, the cutting member 503 is reciprocated along the outer circumference of the cylinder 502.

Meanwhile, the polypropylene melt discharged from the homogenizing part 400 is injected under pressure to the plurality of cavities 501A formed on the guide bar 501 and then expanded through the through holes 502A of the cylinder 502. At this time, when each through hole 502A of the cylinder 502 corresponds to each through hole 503A of the cutting member 503 by the reciprocation of the cutting member 503 by the operation of the driving means 510, the polypropylene melt passes through the through holes 502A and 503A and then is expanded to the outside of the cutting member 503 with a certain length. Then, when through holes 502A of the cylinder 502 are released from the corresponding state with the through holes 503A of the cutting member 503 by the movement of the cutting member 503, the expanded polypropylene melt is cut by edges of the through holes 503A of the cutting member 503. Here, a dimension (length) of the cut foams is determined by a moving speed of the cutting members 503.

Thus, after the polypropylene melt is expanding through the through holes 502A of the cylinder 502 and cut by the cutting member 503, the pellet-type foams are formed. A diameter of each through hole 502A of the cylinder 502 is 0.7 mm and the expansion rate is about 5 times of a diameter of the through hole. Also, the cutting member 503 is reciprocated at a speed of 600 revolutions per minute.

The polypropylene melt transferred from the crushing part 400B are subjected under a pressure of 120 kgf/cm$^2$ in the dies part. If the polypropylene melt in the dies is exposed directly to the atmosphere, most of the foams are open cells. In order to prevent production of open cells, in the present invention, a decompression means is installed at the outside of the dies part.

In FIG. 7, an example of the decompression means installed at the dies part is shown. The decompression means 600 is a casing 601 for isolating the discharging part 500A and the cutting part 500B of the dies part 500 from the outside (the atmosphere). It is to be understood that a shape of the casing 601 is not limited. An entrance port 602 through which air is introduced is formed at an side of the casing 601, an exit port 603 through which air is exhausted is formed at the other side of the casing 601.

A temperature of the air which is supplied to the casing 601 is room temperature or less and can be maintained by a cooling means (not shown). Also, it goes without saying that, in order to maintain properly a pressure in the casing 601 (for example, 0.8 Kgf/cm$^2$), an amount of the air supplied to the casing 601 can be controlled by a pump (not shown). Meanwhile, the exit port 603 can be connected to a storage means for storing the prepared pellet-type foams along with discharged air.

A temperature in the cylinder 502 constituting the dies part 500 is very high and therefore, the temperature of the cylinder 502 should be properly maintained. For this, the present invention uses a cooling device 700 using the heat transfer oil, which is mounted on the dies part.

Figure 10A:
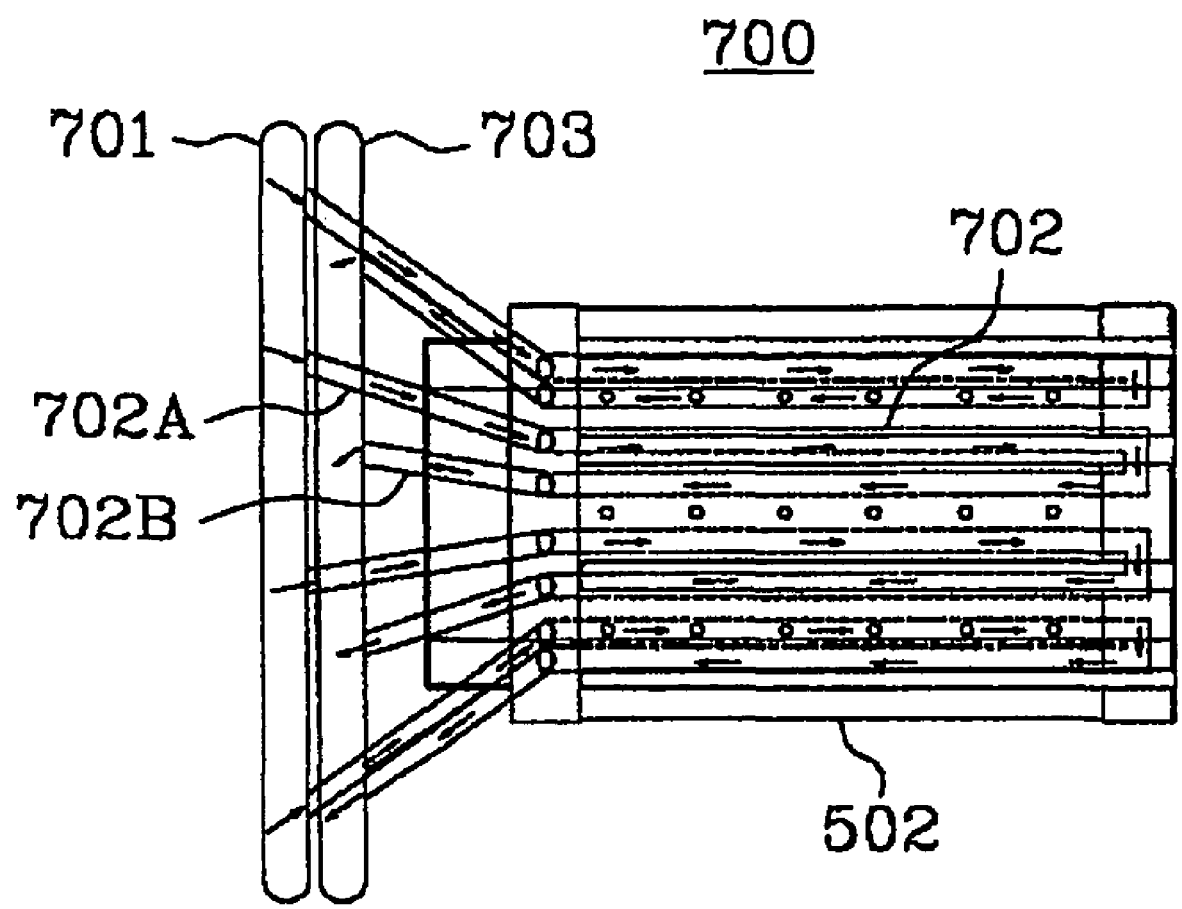
FIG. 10A is a side view showing a cylinder of the die part to which a cooling device is mounted.
Figure 10B:
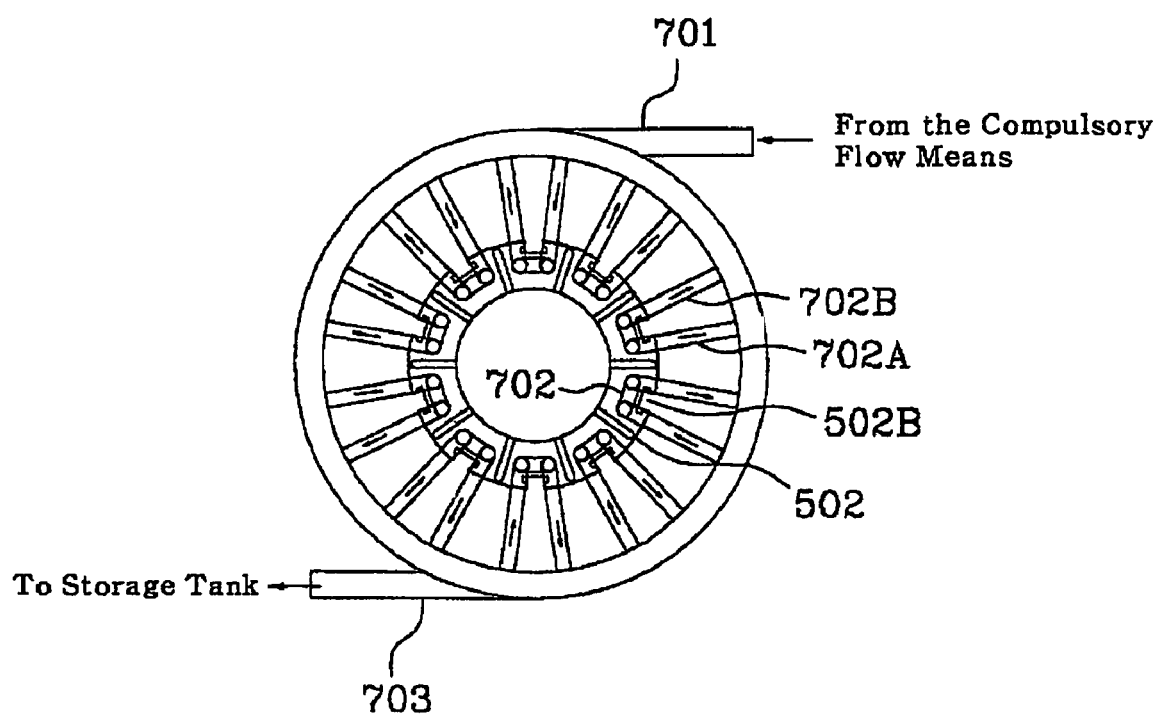
FIG. 10B is a front view of FIG. 10A.

FIG. 10A is a side view showing a cylinder of the dies part to which a cooling device is mounted and FIG. 10B is the front view of FIG. 10A. The casing 601 of the decompression means 600 illustrated in FIG. 7 is not shown for conveniences' sake.

The cooling device 700 used in the present invention comprises a ring-type supplying pipe 701 located at the front of the cylinder 502, and through which heat transfer oil is supplied from the outside, a plurality of flowing pipes 702 connected to the supplying pipe 701 via an entrance end 702A thereof and installed in the cylinder 502, and an discharging pipe 703 located at the front of the cylinder 502 and connected to an exit end 702B of the flowing pipe 702.

The ring-type pipe 701 for supplying the heat transfer oil, located at the front of the cylinder 502, is connected at one end to a compulsory flowing means (not shown) such as a pump so that the heat transfer oil is supplied to the supplying pipe at a constant pressure. The heat transfer oil is injected to the plurality of flowing pipes 702 through entrance ends 702A of the flowing pipes 702 connected to the supplying pipe 701.

The plurality of flowing pipes 702 disposed at a regular interval on the entire outer circumference of the cylinder 502 are extended along the entire length of the cylinder 502, and each entrance end 702A and each exit end 702B of the flowing pipes 702 are exposed to the front end of the cylinder 502. Therefore, the heat transfer oil supplied through each entrance end 702A from the heat transfer oil supplying pipe 701 flows through the flowing pipes 702 along the entire length of the cylinder 502 (that is, after performing the heat exchange), and then is discharged via each exit end 702B.

The ring-type pipe 703 for discharging the heat transfer oil located at the front of the cylinder 502 is connected at one end to the heat transfer oil storage tank (not shown). Thus, the heat transfer oil after performing heat exchange with the cylinder 502 while flowing through the flowing pipes 702 flows into the heat transfer oil discharging pipe 703 through the exit end 702B and then is directed to the heat transfer oil storage tank.

As described above, in the course of flowing through the heat transfer oil supplying pipe 701, the flowing pipes 702 installed in the cylinder 702 and the heat transfer oil discharging pipe 703, the heat exchange between the heat transfer oil and the cylinder 502 is accomplished, whereby the cylinder can be constantly Kept at a suitable temperature for the production of foams.

Meanwhile, the supplying pipe 701 for supplying the heat transfer oil to the flowing pipes 702 and the discharging pipe 703 to which the heat transfer oil from the flowing pipes 702 is supplied have a ring shape so that the heat transfer oil is simultaneously supplied to and received from the flowing pipes 702 mounted on the circumference of the cylinder 502 whose section is a circular shape. However, the shape of the supplying pipe 701 and the discharging pipe 703 is not limited to a ring and can have a different shape, for example polygonal shape.

Now, the present invention will be described in more detail by the following Examples. However, it is to be understood that the following examples are presented to illustrate further various aspects of the present invention, but are not intended to limit the scope of the invention in any aspects.

EXAMPLE 1

In order to prepare the pellet-type foams of non-crosslinked polypropylene according to the invention, a tandem extruder having a first extruder with the inner diameter of 65 mm and a second extruder with the inner diameter of 900 mm was modified. A gear pump and a dies part were connected successively to the rear end of the second extruder. A homogenizing means as shown in FIG. 3 was installed at a position where the melt is discharged from the gear pump, a compression means is provided outside the dies. Through holes of the dies had a diameter of 0.7 mm and a pressure in the dies was maintained at 0.5 kgf/cm$^2$. A rotating speed of the first extruder was set at 24 rpm and a rotating speed of the second extruder was set at 9 rpm.

40 kg of random copolymer RP2400 (polypropylene-3 weight % ethylene; melting index 0.25; melting point 138° C.) commercially obtained from Yuhwa Korea Petrochemical Ind. Co., Ltd. and 800 g of sodium carbonate commercially obtained from Keum Yang Co., Ltd. were supplied to the extruder through respective hoppers. 300 g of paraffin wax M1 commercially obtained from Leochemical Co., Ltd (Kimhae, Korea) was supplied to the third temperature zone of the first extruder. 12 kg of LPG was supplied to the fourth temperature zone of the extruder by using a metering pump. Temperature conditions specified from the extruder through the homogenizing device are shown in Table 1, and LD of the each temperature zone was 360 mm.

TABLE 1

| Device | Temperature condition | |
|---|---|---|
| | Temperature Zone No. | Temperature (° C.) |
| First Extruder | 1st | 150 |
| | 2nd | 170 |
| | 3rd | 170 |
| | 4th | 220 |
| | 5th | 200 |
| | 6th | 190 |
| Guide* | | 250 |
| Second Extruder | 1st | 170 |
| | 2nd | 150 |
| | 3rd | 144 |
| | 4th | 139 |
| | 5th | 138 |
| | 6th | 136 |
| Gear pump | | 133 |
| Homogenizing device | | 130 |

*installed between the first extruder and second extruder for guiding the melt that have passed from the sixth temperature zone of the first extruder to the first temperature zone of the second extruder.

EXAMPLE 2

The temperature conditions in the device were set as described in Table 2 and the pellet-type foams were prepared by using the same procedure and materials as in Example 1.

TABLE 2

| Device | Temperature condition | |
|---|---|---|
| | Temperature Zone No. | Temperature (° C.) |
| First Extruder | 1st | 150 |
| | 2nd | 170 |
| | 3rd | 170 |
| | 4th | 220 |
| | 5th | 200 |
| | 6th | 190 |
| Guide | | 250 |
| Second Extruder | 1st | 170 |
| | 2nd | 150 |
| | 3rd | 145 |
| | 4th | 140 |
| | 5th | 138 |
| | 6th | 135 |
| Gear pump | | 130 |
| Homogenizing device | | 125 |

EXAMPLE 3

The temperature conditions in the device were set as described in Table 3 and the pellet-type foams were prepared by using the same procedure and materials as in Example 1.

TABLE 3

| Device | Temperature condition | |
|---|---|---|
| | Temperature Zone No. | Temperature (° C.) |
| First Extruder | 1st | 147 |
| | 2nd | 167 |
| | 3rd | 168 |
| | 4th | 218 |
| | 5th | 202 |

TABLE 3-continued

| Device | Temperature condition | |
|---|---|---|
| | Temperature Zone No. | Temperature (° C.) |
| | 6th | 188 |
| Guide | | 248 |
| Second Extruder | 1st | 167 |
| | 2nd | 147 |
| | 3rd | 142 |
| | 4th | 137 |
| | 5th | 137 |
| | 6th | 132 |
| Gear pump | | 130 |
| Homogenizing device | | 129 |

EXAMPLE 4

The temperature conditions in the device were set as described in Table 4 and the pellet-type foams were prepared by using the same procedure and materials as in Example 1.

TABLE 4

| Device | Temperature condition | |
|---|---|---|
| | Temperature Zone No. | Temperature (° C.) |
| First Extruder | 1st | 151 |
| | 2nd | 170 |
| | 3rd | 170 |
| | 4th | 219 |
| | 5th | 202 |
| | 6th | 190 |
| Guide | | 252 |
| Second Extruder | 1st | 170 |
| | 2nd | 150 |
| | 3rd | 146 |
| | 4th | 141 |
| | 5th | 140 |
| | 6th | 135 |
| Gear pump | | 130 |
| Homogenizing device | | 127 |

EXAMPLE 5

The temperature conditions in the device were set as described in Table 5 and the pellet-type foams were prepared by using the same procedure and materials as in Example 1.

TABLE 5

| Device | Temperature condition | |
|---|---|---|
| | Temperature Zone No. | Temperature (° C.) |
| First Extruder | 1st | 153 |
| | 2nd | 172 |
| | 3rd | 172 |
| | 4th | 225 |
| | 5th | 203 |
| | 6th | 193 |
| Guide | | 255 |
| Second Extruder | 1st | 173 |
| | 2nd | 152 |
| | 3rd | 147 |
| | 4th | 141 |
| | 5th | 142 |
| | 6th | 137 |

TABLE 5-continued

| Device | Temperature condition Temperature Zone No. | Temperature (° C.) |
|---|---|---|
| Gear pump | | 134 |
| Homogenizing device | | 130 |

EXAMPLE 6

The temperature conditions in the device were set as described in Table 6 and the pellet-type foams were prepared by using the same procedure and materials as in Example 1.

TABLE 6

| Device | Temperature condition Temperature Zone No. | Temperature (° C.) |
|---|---|---|
| First | 1$^{st}$ | 149 |
| Extruder | 2$^{nd}$ | 170 |
| | 3$^{rd}$ | 171 |
| | 4$^{th}$ | 224 |
| | 5$^{th}$ | 200 |
| | 6$^{th}$ | 191 |
| Guide | | 250 |
| Second | 1$^{st}$ | 170 |
| Extruder | 2$^{nd}$ | 150 |
| | 3$^{rd}$ | 145 |
| | 4$^{th}$ | 140 |
| | 5$^{th}$ | 140 |
| | 6$^{th}$ | 135 |
| Gear pump | | 134 |
| Homogenizing device | | 130 |

EXAMPLE 7

The temperature conditions in the device were set as described in Table 7 and the pellet-type foams were prepared by using the same procedure and materials as in Example 1.

TABLE 7

| Device | Temperature condition Temperature Zone No. | Temperature (° C.) |
|---|---|---|
| First | 1$^{st}$ | 150 |
| Extruder | 2$^{nd}$ | 170 |
| | 3$^{rd}$ | 170 |
| | 4$^{th}$ | 220 |
| | 5$^{th}$ | 200 |
| | 6$^{th}$ | 190 |
| Guide | | 250 |
| Second | 1$^{st}$ | 167 |
| Extruder | 2$^{nd}$ | 152 |
| | 3$^{rd}$ | 142 |
| | 4$^{th}$ | 141 |
| | 5$^{th}$ | 137 |
| | 6$^{th}$ | 132 |
| Gear pump | | 134 |
| Homogenizing device | | 130 |

COMPARATIVE EXAMPLE 1

Pellet-type foams were prepared by using the same procedure and materials as in Example 1 and setting the temperature conditions in the device as described in Table 1 except that the homogenizing device was not operated. The homogenizing device was maintained at a temperature of 130° C. but was not activated. Therefore, the melt from the gear pump passed through the temperature zone of 130° C. without homogenization to be introduced to the dies.

COMPARATIVE EXAMPLE 2

Pellet-type foams were prepared by using the same procedure and materials as in Example 1 and setting the temperature conditions in the device as described in Table 1 except for the first temperature zone of the first extruder, which was set to 146° C.

COMPARATIVE EXAMPLE 3

Pellet-type foams were prepared by using the same procedure and materials as in Example 1 and setting the temperature conditions in the device as described in Table 1 except for the second temperature zone of the first extruder, which was set to 173° C.

COMPARATIVE EXAMPLE 4

Pellet-type foams were prepared by using the same procedure and materials as in Example 1 and setting the temperature conditions in the device as described in Table 1 except for third temperature zone of the first extruder, which was set to 173° C.

COMPARATIVE EXAMPLE 5

Pellet-type foams were prepared by using the same procedure and materials as in Example 1 and setting the temperature conditions in the device as described in Table 1 except for the fourth temperature zone of the first extruder, which was set to 226° C.

COMPARATIVE EXAMPLE 6

Pellet-type foams were prepared by using the same procedure and materials as in Example 1 and setting the temperature conditions in the device as described in Table 1 except for the fifth temperature zone of the first extruder, which was set to 205° C.

COMPARATIVE EXAMPLE 7

Pellet-type foams were prepared by using the same procedure and materials as in Example 1 and setting the temperature conditions in the device as described in Table 1 except for the sixth temperature zone of the first extruder, which was set to 187° C.

COMPARATIVE EXAMPLE 8

Pellet-type foams were prepared by using the same procedure and materials as in Example 1 and setting the temperature conditions in the device as described in Table 1 except for the guide, which was set to 256° C.

COMPARATIVE EXAMPLE 9

Pellet-type foams were prepared by using the same procedure and materials as in Example 1 and setting the temperature conditions in the device as described in Table 1 except for the first temperature zone of the second extruder, which was set to 174° C.

COMPARATIVE EXAMPLE 10

Pellet-type foams were prepared by using the same procedure and materials as in Example 1 and setting the temperature conditions in the device as described in Table 1 except for the second temperature zone of the second extruder, which was set to 153° C.

COMPARATIVE EXAMPLE 11

Pellet-type foams were prepared by using the same procedure and materials as in Example 1 and setting the temperature conditions in the device as described in Table 1 except for the third temperature zone of the second extruder, which was set to 148° C.

COMPARATIVE EXAMPLE 12

Pellet-type foams were prepared by using the same procedure and materials as in Example 1 and setting the temperature conditions in the device as described in Table 1 except for the fourth temperature zone of the second extruder, which was set to 142° C.

COMPARATIVE EXAMPLE 13

Pellet-type foams were prepared by using the same procedure and materials as in Example 1 and setting the temperature conditions in the device as described in Table 1 except for the fifth temperature zone of the second extruder, which was set to 143° C.

COMPARATIVE EXAMPLE 14

Pellet-type foams were prepared by using the same procedure and materials as in Example 1 and setting the temperature conditions in the device as described in Table 1 except for the sixth temperature zone of the second extruder, which was set to 138° C.

COMPARATIVE EXAMPLE 15

Pellet-type foams were prepared by using the same procedure and materials as in Example 1 and setting the temperature conditions in the device as described in Table 1 except for the gear pump, which was set to 141° C.

COMPARATIVE EXAMPLE 16

Pellet-type foams were prepared by using the same procedure and materials as in Example 1 and setting the temperature conditions in the device as described in Table 1 except for the homogenizing device, which was set to 131° C.

EXPERIMENTAL EXAMPLE 1

Figure 11:
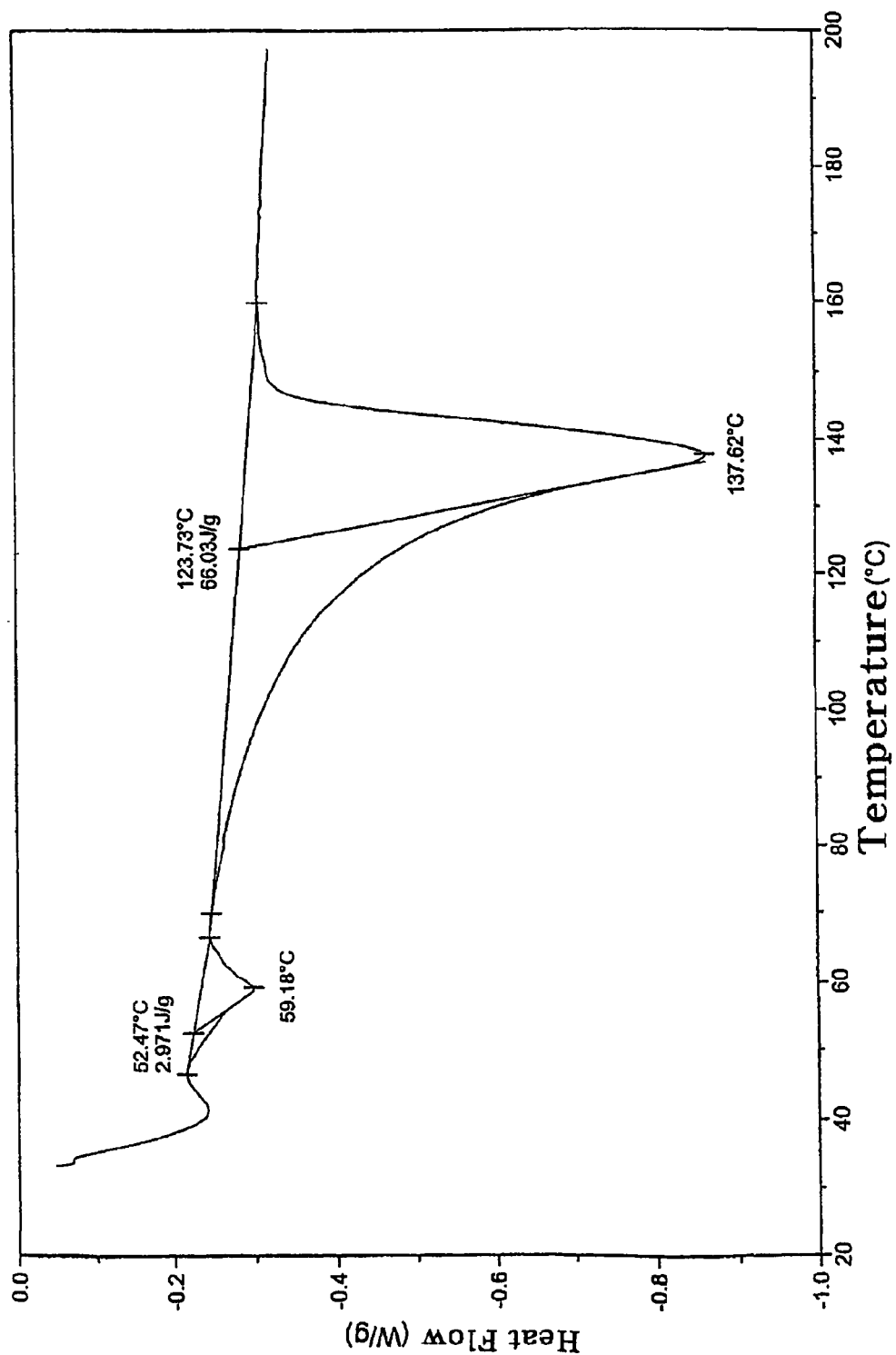
FIG. 11 is a DSC curve of the pellet-type polypropylene foams (Example 1) prepared according to the present invention.
Figure 12:
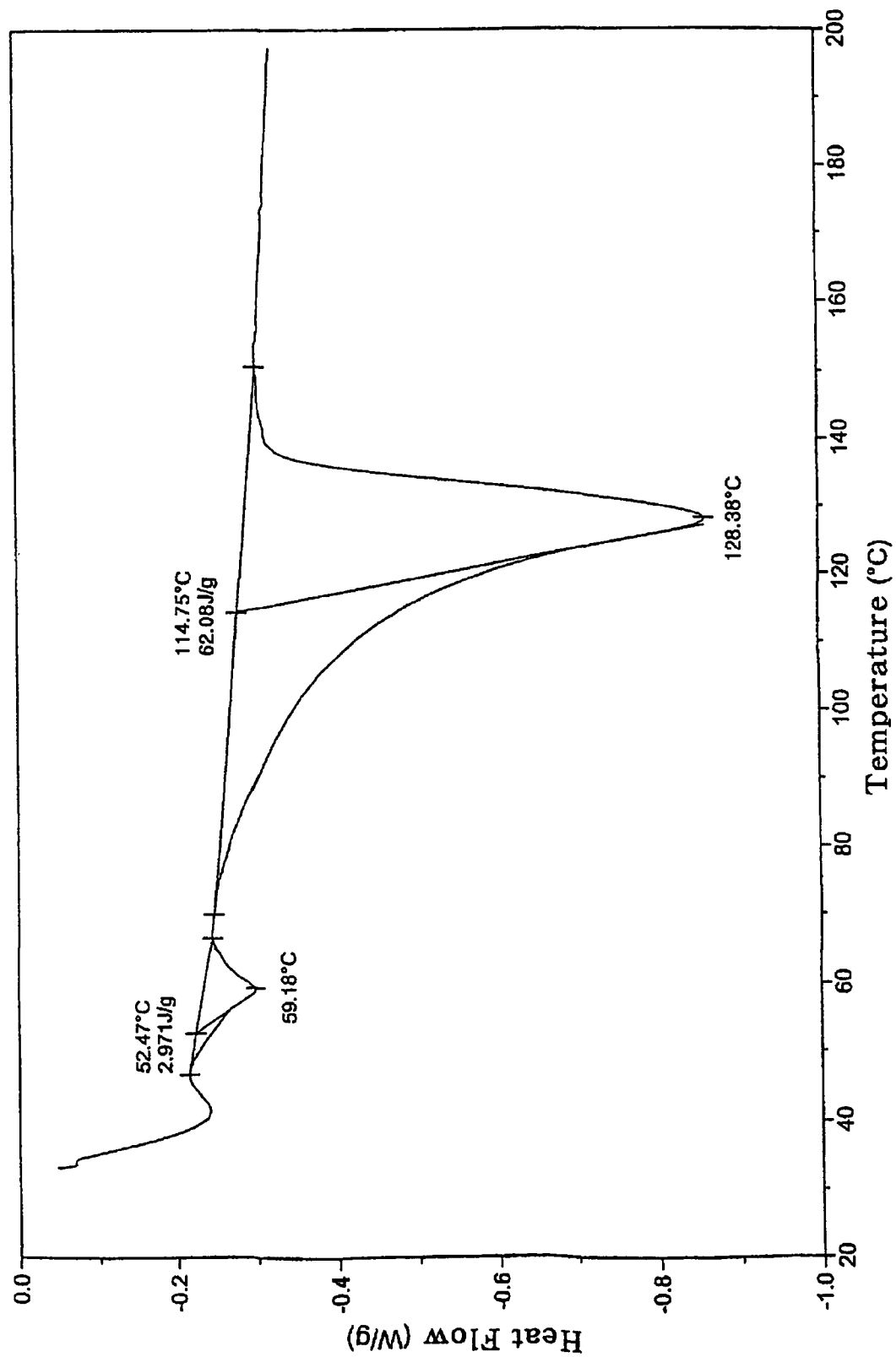
FIG. 12 is a DSC curve of the pellet-type polypropylene foams (Example 2) prepared according to the present invention.
Figure 13:
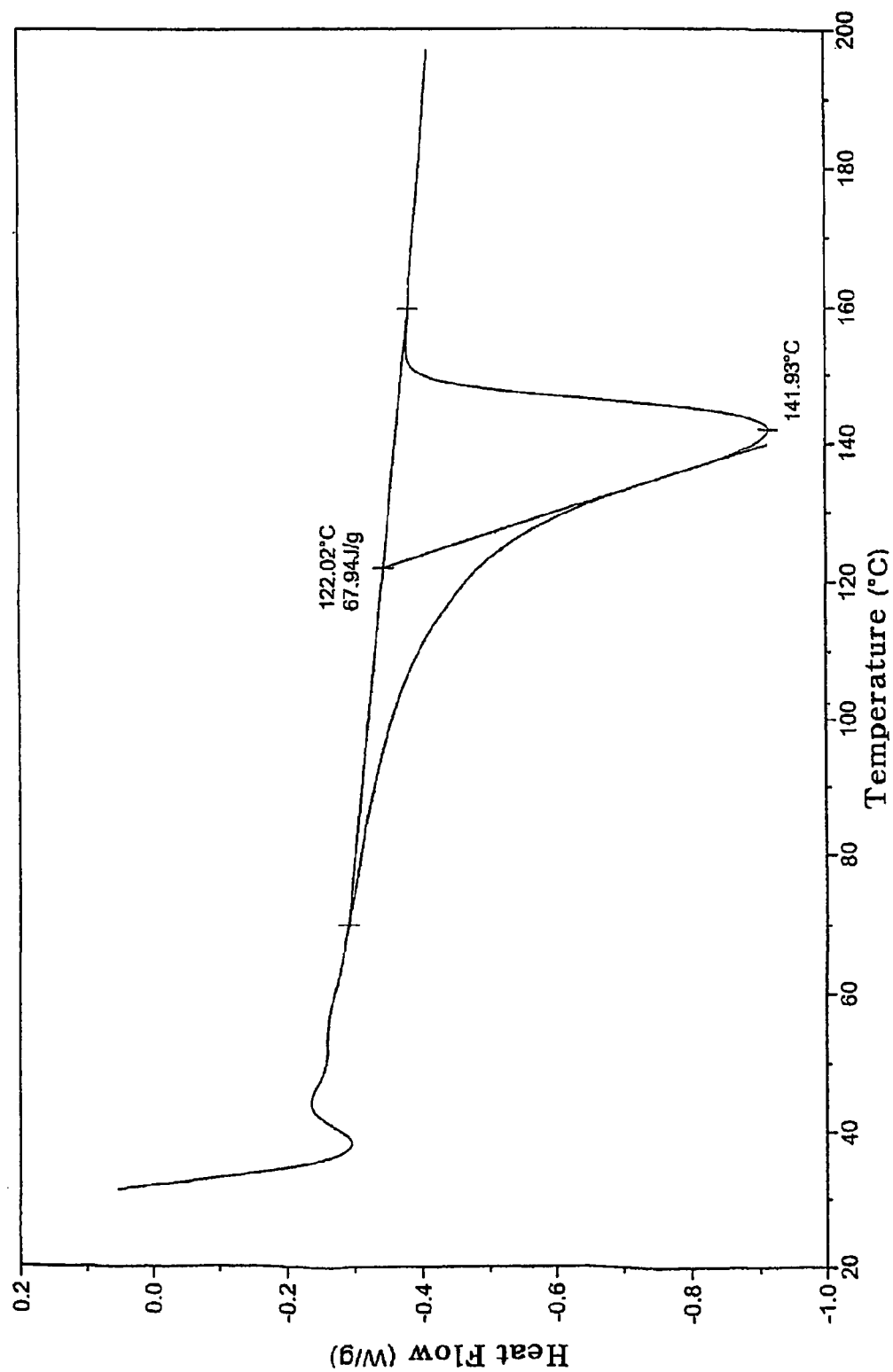
FIG. 13 is a DSC curve of RP2400 (polypropylene-polyethylene (3%)) copolymer used for preparing the pellet-type polypropylene foams of the present invention.

The pellet-type foams obtained from Example 1 and Example 2 were measured for DSC (differential scanning calorimeters; 10° C./min. to 200° C., 50 cc/min. to $N_2$ purge) transition temperature according to the test method KSM3050-2001. The results are shown in FIG. 11 and FIG. 12. As shown in the DSC curves of FIG. 11 and FIG. 12, the foams of Example 1 and Example 2 had melting points of 137.62° C. and 128.38° C., respectively, which are lower than the melting point of 138° C. of the random copolymer (RP2400 (polypropylene-polyethylene (3%) random copolymer) used as the row material. RP2400 random copolymer as control was measured for the DSC transition temperature. The results are shown in FIG. 13.

EXPERIMENTAL EXAMPLE 2

The pellet-type foams obtained from Example 1 and RP2400 (polypropylene-polyethylene (3%)) random copolymer as control were subject to the elementary analysis. The analysis was performed by using the CE EA-1110 elementary analyzer. The results are shown in Table 8 given below.

TABLE 8

Results of the elementary analysis

| Sample | analysis item | | |
|---|---|---|---|
| | C (%) | H (%) | N (%) |
| RP2400 random copolymer | 85.1 | 15.0 | N.D.* |
| Pellet-type foams of Example 1 | 84.2 | 14.8 | 0.5 |

N.D. means "non-detectable". The detecting limit of N is 0.1%.

EXPERIMENTAL EXAMPLE 3

Figure 14:
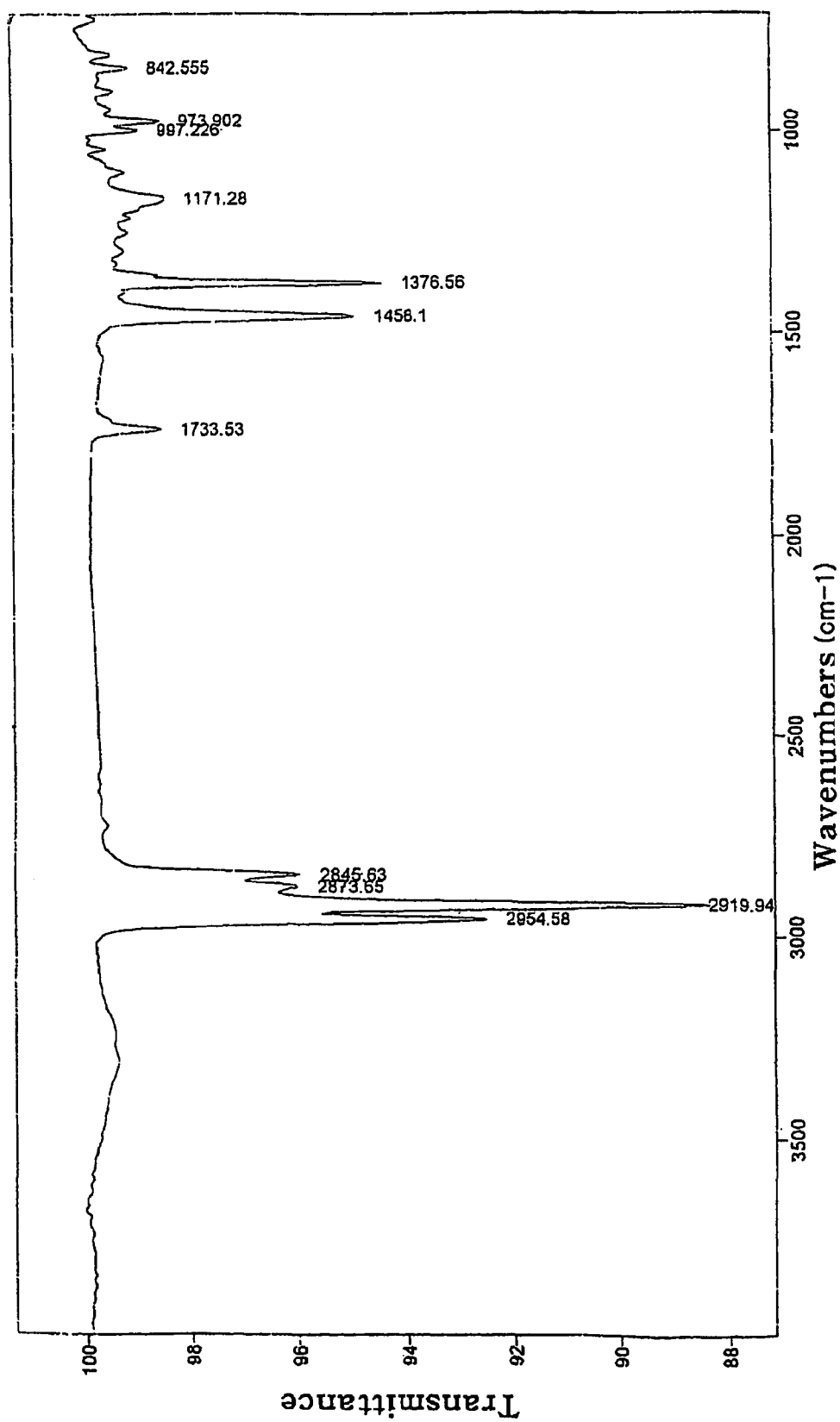
FIG. 14 shows the result of the FT-IR analysis of the pellet-type polypropylene foams prepared according to the present invention.
Figure 15:
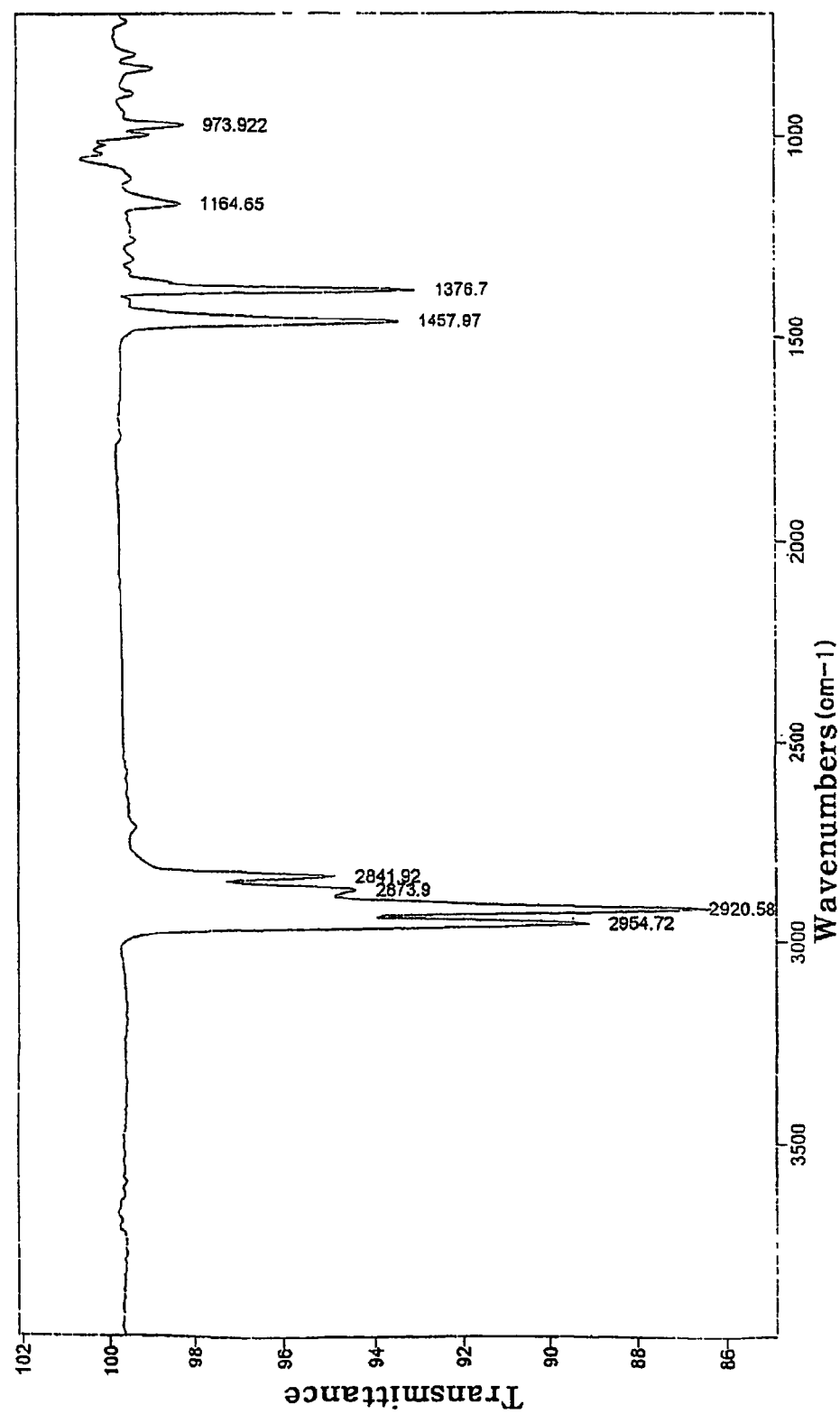
FIG. 15 shows the result of the FT-IR analysis of RP2400 (polypropylene-polyethylene (3%)) copolymer used for preparing the pellet-type polypropylene foams of the present invention.
Figure 16A:
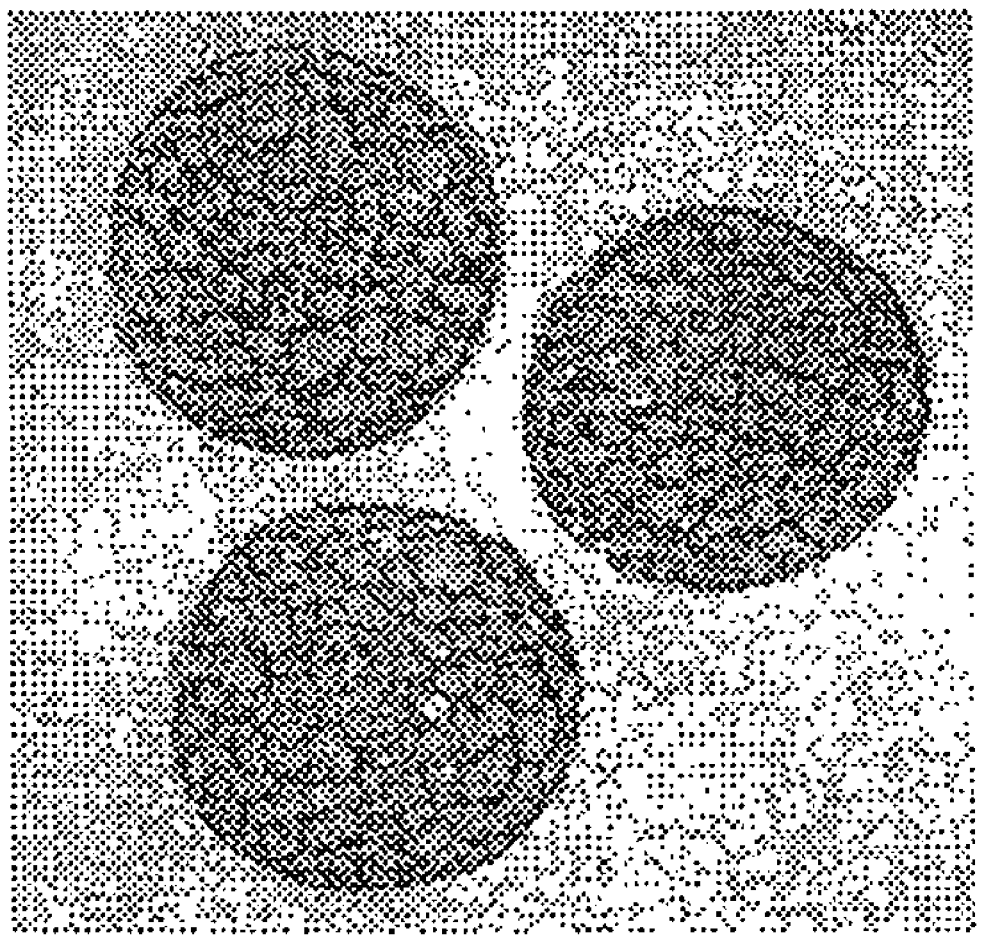
FIG. 16A is a photograph taken by an optical microscope at ×100 magnification and showing the pellet-type polypropylene foams prepared according to the present invention.
Figure 16B:
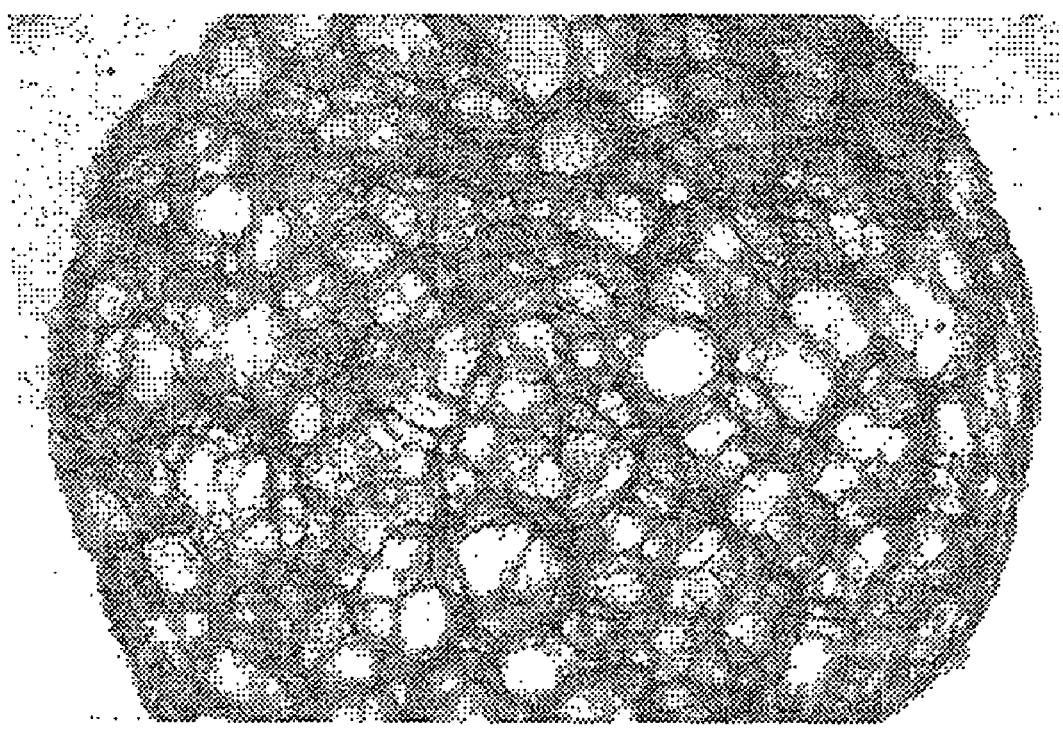
FIG. 16B is a photograph taken by an optical microscope at ×400 magnification and showing the pellet-type polypropylene foams prepared according to the present invention.

The pellet-type foams obtained from Example 1 and RP2400 (polypropylene-polyethylene (3%)) random copolymer as control were subjected to the FT-IR analysis. The analysis was performed by using the Bio-Rad Digilab FTS-165 FT-IR Spectrophotometer. The results are shown in FIG. 14 and FIG. 15, respectively. According to the results, it is noted that the pellet-type foams obtained from Example 1 and RP2400 random copolymer have a main component of polypropylene.

EXPERIMENTAL EXAMPLE 4

The open cell contents of the pellet-type foams prepared in the Examples and Comparative Examples were measured according to the procedure C described in the ASTM D 2856-70. The results are shown in Table 9 given below.

TABLE 9

| No. | Open cell content |
|---|---|
| Example | |
| 1 | 6% |
| 2 | 13% |
| 3 | 12% |
| 4 | 16% |
| 5 | 14% |
| 6 | 7% |
| 7 | 12% |
| Comparative example | |
| 1 | 68% |
| 2 | 49% |
| 3 | 52% |
| 4 | 38% |
| 5 | 44% |
| 6 | 39% |

TABLE 9-continued

| No. | Open cell content |
|---|---|
| 7 | 52% |
| 8 | 40% |
| 9 | 37% |
| 10 | 36% |
| 11 | 31% |
| 12 | 53% |
| 13 | 29% |
| 14 | 28% |
| 15 | 26% |

EXPERIMENTAL EXAMPLE 5

Other physical properties of the foams prepared in Example 1 were measured according to a conventional method. The results are shown in Table 10 given below.

TABLE 10

| Item | Foams of Example 1 |
|---|---|
| Magnification | 25 |
| Appearance color | Light ivory |
| Cell Size | 300 μm |
| Compressive strength | 0.81 kgf/cm$^2$ |

EXPERIMENTAL EXAMPLE 6

The pellet-type foams obtained from Example 1 was molded by using a molder, 500GF 4, produced by Daekong Machinery Co., Ltd., with a molding pressure set to 2.5 kgf/cm$^2$ (temperature of about 138° C.), to produce a well-molded article. Through production of such a well-molded article, it is proved that the pellet-type foams according to the present invention are melted at a temperature of 138° C. to adhere to each other, leading to sold bonding between foams.

EXPERIMENTAL EXAMPLE 7

The pellet-type foams obtained from Example 2 was molded by using a molder, 500GF 4, produced by Daekong Machinery Co., Ltd., with a molding pressure set to 2.4 kgf/cm$^2$ (temperature of about 132° C.), to produce a well-molded article. Through production of such well-molded article, it is proved that the pellet-type foams according to the present invention are are melted at a temperature of 132° C. to adhere to each other, leading to solid bonding between foams.

From the above description, it will be appreciated that the present invention can be embodied as other specific forms by those skilled in the art without departing from the spirit and indispensable features of the present invention. With regard this, it should be understood that the examples and experimental examples described above have been made by way of example and not as a limitation. It should be construed that all modification and change derived from the meaning and scope of the claims described below and equivalent rather than the above description and equivalents thereof are intended to be included within the scope of this invention.

The pellet-type foams of non-crosslinked polypropylene according to the present invention has a closed cell content of 80% or more and a melting point of 125 to 140° C. so that the pellet-type foams of the invention is much available in a standpoint of formation and regeneration.

What is claimed is:

1. A device for producing a pellet-type non-crosslinked polypropylene foam having a melting point of 125 to 140° C., comprising a first extruder, a second extruder connected to the first extruder, a pumping part connected to the second extruder, a homogenizing part connected to the pumping part and a dies part connected to the homogenizing part, wherein the first extruder comprises a cylindrical cylinder in which a screw shaft is mounted rotatably, a driving controller installed at an end of the cylinder for rotating the screw shaft and a plurality of cooling water passages and heaters that are alternately mounted on an outer circumference of the cylinder, wherein each set of alternating cooling water passages and heaters form a specific temperature zone, the cylinder has entrances formed at an end portion thereof corresponding to the driving controller for supplying a raw polypropylene and a nucleating agent thereto, an exit formed at another end portion thereof, entrances formed at a midportion thereof for supplying an additive and a foaming agent, respectively, whereby the raw material supplied to the cylinder via the entrances is flow compulsorily toward the exit by the screw shaft rotated according to the driving controller;

the second extruder comprises a cylinder into which the polypropylene melt discharged from the cylinder of the first extruder is supplied through the guide, and a plurality of cooling heating units mounted to an outer circumference surface of the cylinder for adjusting a temperature of the polypropylene melt in the cylinder;

the pumping part comprises a casing having an inner space into which the polypropylene melt discharged from the cylinder of the second extruder is supplied, a pair of gears installed rotatably and meshed with each other in the inner space of the casing and a driving unit for rotating the gears, whereby the polypropylene melt supplied therein is flow compulsorily;

the homogenizing part comprises a first cylindrical housing into which the polypropylene melt discharged from the cylinder of the pumping part is supplied, the first housing being installed rotatably, a driving element for rotating the first housing, a screw connected to an exit end of the first housing, a second housing located on an outer circumference of the screw, a frame mounted to an outer circumference of the second housing for forming an airtight space between the second housing and the frame, and a homogenizer installed at a rear end of the second housing; wherein a spiral space is formed between the screw and the second housing along the entire length of the screw so that the polypropylene melt discharged from the first housing is flow in the space formed between the screw and the second housing and discharged to an outside, a heat transfer fluid oil flows in a space formed between the second housing and the frame to adjust a temperature of the polypropylene melt which flows in the second housing, and the homogenizer crushes the polypropylene melt;

the dies part into which the polypropylene melt discharged from the homogenizing part is supplied includes a discharging part, a cutting part, and a driving member so that expanded foams are cut at a certain size.

2. The device for producing a pellet-type foam of claim 1, wherein each cooling water passages mounted to the cylinders of the first and second extruders is a casing in which a cooling water supplied from an outside flows, the cooling water supplied to the casing is contacted with a surface of the cylinder and flow along the casing so that a temperature of the polypropylene melt that flows in the cylinder becomes lower, each heater mounted between two casings is a heater in which a heating coil is installed.

3. The device for producing a pellet-type foam of claim 1, wherein the cylinder of the first extruder is divided into six temperature zones according to the temperature condition of the polypropylene melt supplied to the cylinder, a temperature of each zone is adjusted by the cooling water passages and heaters mounted to an outer circumference of the cylinder, a temperature of the polypropylene melt is 147 to 153° at the first temperature zone, 167 to 172° C. at the second temperature zone, 168 to 172° C. at the third temperature zone, 218 to 225° C. at the fourth temperature zone, 197 to 203° C. at the fifth temperature zone and 188 to 193° C. at the sixth temperature zone.

4. The device for producing a pellet-type foam of or claim 3, wherein the entrances for supplying a raw polypropylene and a nucleating agent are formed on the first temperature zone of the cylinder of the first extruder, the entrance for supplying antistatic agent is formed on the third temperature zone, and the entrance for supplying a foaming agent is formed on the fourth temperature zone.

5. The device for producing a pellet-type foam of claim 4, wherein the foaming agent to be supplied to the cylinder of the first extruder is $CO_2$ discharged from a device for supplying $CO_2$, the device for supplying $CO_2$ comprises a tank for storing $CO_2$, an unit for vaporizing and freezing $CO_2$ connected to the tank, a stabilizing unit for transforming $CO_2$ supplied from the unit for vaporizing and freezing into a vapor; and a storage unit for storing $CO_2$ supplied from the stabilizing unit to supply $CO_2$ into the first cylinder of the first extruder.

6. The device for producing a pellet-type foam of claim 1, wherein the cylinder of the second extruder is divided into six temperature zones according to the temperature condition of the polypropylene melt supplied to the cylinder, a temperature of each zone is adjusted by the cooling water passages and heaters mounted to an outer circumference of the cylinder, a temperature of the polypropylene melt is 167 to 173° C. at the first temperature zone, 147 to 152° C. at the second temperature zone, 142 to 147° C. at the third temperature zone, 137 to 141° C. at the fourth temperature zone, 137 to 142° C. at the fifth temperature zone and 132 to 137° C. at the sixth temperature zone.

7. The device for producing a pellet-type foam of claim 1, wherein the two gears mounted in the inner space of the casing of the pumping part are rotated in an opposite direction from each other toward a center of the inner space to make the polypropylene melt move compulsorily to a next process position.

8. The device for producing a pellet-type foam of claim 1, wherein the first housing of the homogenizing part is supported rotatably to support plates through a plurality bearing blocks, a drive sprocket of the driving element is geared with a driven sprocket fixed to an outer circumference surface of the first housing so that the first housing is rotated in response of an operation of the driving element.

9. The device for producing a pellet-type foam of claim 1, wherein the homogenizer of the homogenizing part is consisted of a rotating plate mounted rotatably and a fixing plate contacted with the rotating plate, the rotating plate has a plurality of openings arranged radially and the fixing plate has a plurality of circular holes, whereby after the supplied polypropylene melt is arrived at the rotating plate and passed through each opening formed on the rotating plate, the polypropylene melt is cut by an edge of each opening of the rotating plate, and then the crushed polypropylene melt is ground between the rotating plate and the fixing plate by the rotating plate.

10. The device for producing a pellet-type foam of claim 1, wherein
the discharging part of the dies part is consisted of a hollow guide bar and a cylinder located on an outside of the guide bar, the guide bar has a plurality of cavities formed on the outer circumference thereof in a longitudinal direction of the guide bar so that the polypropylene melts discharged from the homogenizing part flows in each cavity, a plurality of through holes are formed at portions of the cylinder which are corresponded to the cavities, respectively;
the cutting part comprises a supporting plate located at a rear side of the discharging part and cutting members fixed to the supporting plate and located movably on an outside of the cylinder, each cutting member has a plurality of through holes formed at positions where are corresponded to the plurality of through holes of the cylinder, respectively; and
the driving member comprises an eccentric cam being able to rotate by a motor, a crank connected to the eccentric cam and rotated in response to a rotation of the cam and a power converting and transmitting unit connected to the crank for converting a rotating movement of the crank into a linear movement and transmitting the linear movement to the supporting plate to which the cutting member is fixed; whereby each cutting member is reciprocated along the outer circumference of the cylinder according to an operation of the driving member so that the polypropylene foams expanded through each through hole of the cylinder is cut by edges of the through holes of the cutting member.

11. The device for producing a pellet-type foam of claim 10, wherein a diameter of each through hole formed on the cylinder is less than that of each through hole of the cutting member, each through hole of the cylinder is located on a central portion of the corresponding through hole of the cutting member at an initial position.

12. The device for a producing pellet-type foam of claim 10, wherein the cylinder has a plurality of grooves are formed an outer circumference thereof in a longitudinal direction, reciprocating rods whose ends are fixed to the support plate are located movably in the grooves, respectively, and each cutting member is fixed to each reciprocating rod by fixing elements so that each cutting member is reciprocated on an outer circumference of the cylinder by the each reciprocating rod which is reciprocated along each groove of the cylinder.

13. The device for producing a pellet-type foam of claim 10, wherein the dies part further comprises a decompression unit for preventing a rapid change of a temperature and pressure to the expanded and extruded foams, the decompression unit is a casing which is able to isolate the discharging part and cutting part from an outside atmospheric, the casing has an entrance port through which an air is flow and an exit port through which an air is exhausted at both sides.

14. The device for producing a pellet-type foam of claim 10, wherein the dies part further comprises a cooling device for cooling the cylinder, the cooling device comprises;

a supplying pipe into which a heat transfer fluid oil is supplied from an outside, the supplying pipe being located at a front of the cylinder;

a plurality of flowing pipes having entrance ends connected to the supplying pipe and mounted in the cylinder along the entire length of the cylinder; and a discharging pipe being located at a front of the cylinder and connected to exit ends of the flowing pipes for receiving the heat transfer fluid which exchanged a heat with the cylinder.

* * * * *